(12) United States Patent
Yun et al.

(10) Patent No.: US 12,163,702 B2
(45) Date of Patent: Dec. 10, 2024

(54) METHOD FOR CONTROLLING REFRIGERATOR

(71) Applicant: LG ELECTRONICS INC., Seoul (KR)

(72) Inventors: Seokjun Yun, Seoul (KR); Hyoungkeun Lim, Seoul (KR); Junghun Lee, Seoul (KR); Hoyoun Lee, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 611 days.

(21) Appl. No.: 17/434,288

(22) PCT Filed: Feb. 13, 2020

(86) PCT No.: PCT/KR2020/002070
§ 371 (c)(1),
(2) Date: Mar. 18, 2022

(87) PCT Pub. No.: WO2020/175824
PCT Pub. Date: Sep. 3, 2020

(65) Prior Publication Data
US 2022/0235977 A1    Jul. 28, 2022

(30) Foreign Application Priority Data

Feb. 28, 2019    (KR) .................... 10-2019-0024145

(51) Int. Cl.
*F25B 21/04*    (2006.01)
(52) U.S. Cl.
CPC .................... *F25B 21/04* (2013.01)

(58) Field of Classification Search
CPC .................... F25D 11/025; F25D 11/04
See application file for complete search history.

(56) References Cited

U.S. PATENT DOCUMENTS

2010/0146997 A1    6/2010    Eom et al.
2012/0047911 A1    3/2012    Bhavsar
(Continued)

FOREIGN PATENT DOCUMENTS

JP        2004132635 A      4/2004
KR    10-2004-0016659 A     2/2004
(Continued)

OTHER PUBLICATIONS

KR101821289B1 Translation (Year: 2018).*

*Primary Examiner* — Schyler S Sanks
(74) *Attorney, Agent, or Firm* — Bryan Cave Leighton Paisner LLP

(57) ABSTRACT

A method for controlling a refrigerator according to an embodiment of the present invention comprises the steps of: determining whether or not an ultra-low temperature compartment mode is turned on; determining whether or not an ultra-low temperature compartment load-responsive operation input condition is satisfied; and determining whether or not a freezer compartment load-responsive operation input condition is satisfied, wherein if the ultra-low temperature compartment mode is turned on, and the ultra-low temperature compartment load-responsive operation input condition and the freezer compartment load-responsive operation input condition are both satisfied, a corresponding ultra-low temperature compartment load-responsive operation is preferentially performed.

15 Claims, 10 Drawing Sheets

(56) References Cited

U.S. PATENT DOCUMENTS

2018/0031297 A1     2/2018    Kim et al.
2019/0011158 A1     1/2019    Sul et al.

FOREIGN PATENT DOCUMENTS

| | | |
|---|---|---|
| KR | 10-0806313 B1 | 3/2008 |
| KR | 10-2013-0130314 A | 12/2013 |
| KR | 20140019594 A | 2/2014 |
| KR | 10-2015-0074631 A | 7/2015 |
| KR | 10-2016-0097648 A | 8/2016 |
| KR | 101821289 B1 * | 1/2018 |
| KR | 20180055242 A | 5/2018 |
| KR | 1020180105572 A | 9/2018 |
| KR | 10-2019-0005042 A | 1/2019 |

\* cited by examiner (a)

(b)

(c)

METHOD FOR CONTROLLING REFRIGERATOR

This application is the National Stage filing under 35 U.S.C. 371 of International Application No. PCT/KR2020/002070, filed on Feb. 13, 2020, which claims the benefit of Korean Patent Application No. 10-2019-0024145, filed on Feb. 28, 2019, the contents of which are all hereby incorporated by reference herein in their entirety.

TECHNICAL FIELD

The present invention relates to a method for controlling a refrigerator.

BACKGROUND ART

In general, a refrigerator is a home appliance for storing food at a low temperature, and includes a refrigerating compartment for storing food in a refrigerated state in a range of 3° C. and a freezing compartment for storing food in a frozen state in a range of −20° C.

However, when food such as meat or seafood is stored in the frozen state in the existing freezing compartment, moisture in cells of the meat or seafood are escaped out of the cells in the process of freezing the food at the temperature of −20° C., and thus, the cells are destroyed, and taste of the food is changed during an unfreezing process.

However, if a temperature condition of the storage compartment is set to a cryogenic state that is significantly lower than the current temperature of the freezing temperature. Thus, when the food quickly passes through a freezing point temperature range while the food is changed in the frozen state, the destruction of the cells may be minimized, and as a result, even after the unfreezing, the meat quality and the taste of the food may return to close to the state before the freezing. The cryogenic temperature may be understood to mean a temperature in a range of −45° C. to −50° C.

For this reason, in recent years, the demand for a refrigerator equipped with a deep freezing compartment that is maintained at a temperature lower than a temperature of the freezing compartment is increasing.

In order to satisfy the demand for the deep freezing compartment, there is a limit to the cooling using an existing refrigerant. Thus, an attempt is made to lower the temperature of the deep freezing compartment to a cryogenic temperature by using a thermoelectric module (TEM).

Korean Patent Publication No. 2018-0105572 (Sep. 28, 2018) (Prior Art 1) discloses a refrigerator having the form of a bedside table, in which a storage compartment has a temperature lower than the room temperature by using a thermoelectric module.

However, in the case of the refrigerator using the thermoelectric module disclosed in Prior Art 1, since a heat generation surface of the thermoelectric module is configured to be cooled by heat-exchanged with indoor air, there is a limitation in lowering a temperature of the heat absorption surface.

In detail, in the thermoelectric module, when supply current increases, a temperature difference between the heat absorption surface and the heat generation surface tends to increase to a certain level. However, due to characteristics of the thermoelectric element made of a semiconductor element, when the supply current increases, the semiconductor acts as resistance to increase in self-heat amount. Then, there is a problem that heat absorbed from the heat absorption surface is not transferred to the heat generation surface quickly.

In addition, if the heat generation surface of the thermoelectric element is not sufficiently cooled, a phenomenon in which the heat transferred to the heat generation surface flows back toward the heat absorption surface occurs, and a temperature of the heat absorption surface also rises.

In the case of the thermoelectric module disclosed in Prior Art 1, since the heat generation surface is cooled by the indoor air, there is a limit that the temperature of the heat generation surface is not lower than a room temperature.

In a state in which the temperature of the heat generation surface is substantially fixed, the supply current has to increase to lower the temperature of the heat absorption surface, and then efficiency of the thermoelectric module is deteriorated.

In addition, if the supply current increases, a temperature difference between the heat absorption surface and the heat generation surface increases, resulting in a decrease in the cooling capacity of the thermoelectric module.

Therefore, in the case of the refrigerator disclosed in Prior Art 1, it is impossible to lower the temperature of the storage compartment to a cryogenic temperature that is significantly lower than the temperature of the freezing compartment and may be said that it is only possible to maintain the temperature of the refrigerating compartment.

In addition, referring to the contents disclosed in Prior Art 1, since the storage compartment cooled by a thermoelectric module independently exists, when the temperature of the storage compartment reaches a satisfactory temperature, power supply to the thermoelectric module is cut off.

However, when the storage compartment is accommodated in a storage compartment having a different satisfactory temperature region such as a refrigerating compartment or a freezing compartment, factors to be considered in order to control the temperature of the two storage compartments increase.

Therefore, with only the control contents disclosed in Prior Art 1, it is impossible to control an output of the thermoelectric module and an output of a deep freezing compartment cooling fan in order to control the temperature of the deep freezing compartment in a structure in which the deep freezing compartment is accommodated in the freezing compartment or the refrigerating compartment.

In order to overcome limitations of the thermoelectric module and to lower the temperature of the storage compartment to a temperature lower than that of the freezing compartment by using the thermoelectric module, many experiments and studies have been conducted. As a result, in order to cool the heat generation surface of the thermoelectric module to a low temperature, an attempt has been made to attach an evaporator through which a refrigerant flows to the heat generation surface.

Korean Patent Publication No. 10-2016-097648 (Aug. 18, 2016) (Prior Art 2) discloses directly attaching a heat generation surface of a thermoelectric module to ab evaporator to cool the heat generation surface of the thermoelectric module.

However, Prior Art 2 still has problems.

In detail, in Prior Art 2, only structural contents of employing an evaporator through which a refrigerant passing through a freezing compartment expansion valve flows as a heat dissipation unit or heat sink for cooling the heat generating surface of the thermoelectric element are disclosed, and contents of how to control an output of the thermoelectric module according to operation states of the refrigerating compartment in addition to the freezing compartment are not disclosed at all.

For example, when a door of the deep freezing compartment is opened, and a heat load including food is penetrated, a method for rapidly removing the penetrated load has not been disclosed at all. In addition, a method for controlling the thermoelectric module according to the operation state of the freezing compartment or the refrigerating compartment is not disclosed at all.

In addition, when the operation mode conflicts, such as when a load is penetrated into the refrigerating compartment or the freezing compartment while the deep freezing compartment load correspondence operation to lower a deep freezing compartment load is being performed, or when a defrost cycle of the refrigerating compartment or freezing compartment evaporator is reached, there is no disclosure of how the load correspondence operation will be performed.

DISCLOSURE OF THE INVENTION

Technical Problem

The present invention has been proposed to improve the above-described limitations.

In particular, an object of the present invention to provide a method for controlling a refrigerator, which is capable of rapidly removing a load in a deep freezing compartment while minimizing an increase in temperature in other storage compartments when a situation in which the load in the deep freezing compartment rapidly increases occurs.

In other words, an object of the present invention is to quickly remove the deep freezing compartment load without deteriorating performance of other storage compartments, that is, a freezing compartment or a refrigerating compartment.

Also, another object of the present invention is to provide a method for controlling a refrigerator, which is capable of removing loads of other storage compartments when loads in other storage compartments increases during a load removing operation in a deep freezing compartment.

Technical Solution

A method for controlling a refrigerator according to an embodiment of the present invention for achieving the above objects includes a method for controlling a refrigerating including: a refrigerating compartment; a freezing compartment partitioned from the refrigerating compartment; a deep freezing compartment accommodated in the freezing compartment and partitioned from the freezing compartment; a thermoelectric module provided to cool the deep freezing compartment to a temperature lower than that of the freezing compartment; a temperature sensor configured to detect a temperature within the deep freezing compartment; a deep freezing compartment fan configured to allow internal air of the deep freezing compartment to forcibly flow; a freezing compartment fan configured to allow internal air of the freezing compartment to forcibly flow; and a controller configured to control driving of the thermoelectric module, the freezing compartment fan, and the deep freezing compartment fan.

In addition, the method for controlling the refrigerator according to an embodiment of the present invention includes: determining whether a deep freezing compartment mode is in an on state; determining whether an input condition for a deep freezing compartment load correspondence operation is satisfied; and determining whether an input condition for a freezing compartment load correspondence operation is satisfied.

In addition, in the method for controlling the refrigerator according to an embodiment of the present invention, when the deep freezing compartment mode is in the on state, and both of the input conditions for the deep freezing compartment load correspondence operation and the freezing compartment load correspondence operation are satisfied, the deep freezing compartment load correspondence operation is performed by priority.

Advantageous Effects

According to the method for controlling the refrigerator according to the embodiment of the present invention, which has the configuration as described above, the following effects are obtained.

First, if it is determined that a situation in which the heat load is penetrated into the deep freezing compartment, the deep freezing compartment load correspondence operation or the deep freezing compartment load removing operation may be performed to quickly remove the load penetrated into the deep freezing compartment so that the deep freezing compartment temperature is maintained at the satisfactory temperature.

Second, when the deep freezing compartment load removing operation starts, both the refrigerating compartment valve and the freezing compartment valve may be turned on to perform the simultaneous operation, and thus, other storage compartment loads may also be performed together with the deep freezing compartment load removing operation. Then, there may be the advantage of minimizing the phenomenon in which the load of the other storage compartment rapidly increases during the load removing operation of the deep freezing compartment.

Third, when the temperature of the other storage compartment enters the satisfactory temperature range during the simultaneous operation, only the freezing compartment valve may be turned on so that the cooling capacity is concentrated to remove the deep freezing compartment load, thereby reducing the deep freezing compartment load time.

Fourth, when the loads in other storage compartments increase again while the cooling capacity is concentrated for removing the load in the deep freezing compartment in the state in which only the freezing compartment valve is turned on, the mode may be switched again to the simultaneous operation mode to quickly respond to the increase in the load in the other storage compartments.

MODE FOR CARRYING OUT THE INVENTION

Figure 1:
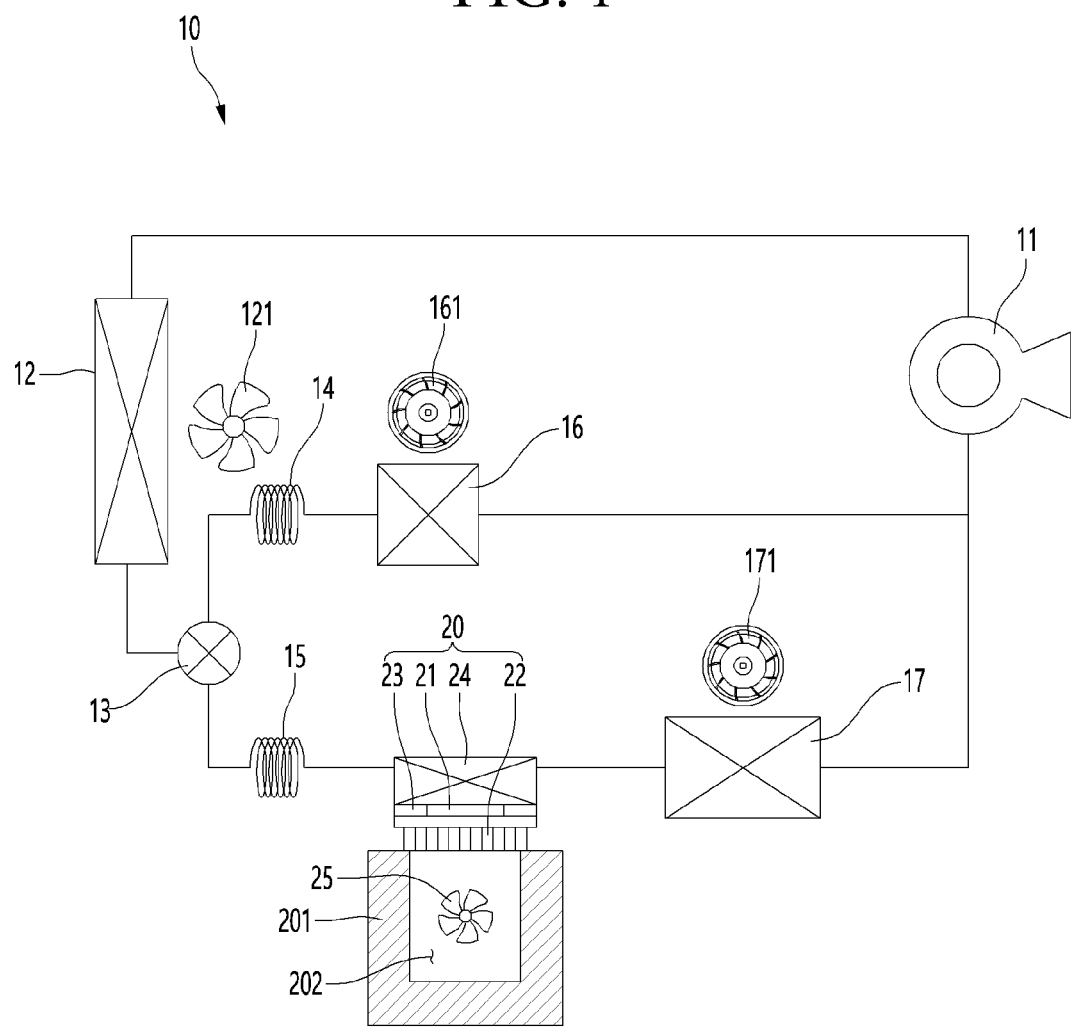
FIG. 1 is a view illustrating a refrigerant circulation system of a refrigerator to which a control method is applied according to an embodiment of the present invention.

Hereinafter, a method for controlling a refrigerator according to an embodiment of the present invention will be described in detail with reference to the accompanying drawings.

In the present invention, a storage compartment that is cooled by a first cooling device and controlled to a predetermined temperature may be defined as a first storage compartment.

In addition, a storage compartment that is cooled by a second cooling device and is controlled to a temperature lower than that of the first storage compartment may be defined as a second storage compartment.

In addition, a storage compartment that is cooled by the third cooling device and is controlled to a temperature lower than that of the second storage compartment may be defined as a third storage compartment.

The first cooling device for cooling the first storage compartment may include at least one of a first evaporator or a first thermoelectric module including a thermoelectric element. The first evaporator may include a refrigerating compartment evaporator to be described later.

The second cooling device for cooling the second storage compartment may include at least one of a second evaporator or a second thermoelectric module including a thermoelectric element. The second evaporator may include a freezing compartment evaporator to be described later.

The third cooling device for cooling the third storage compartment may include at least one of a third evaporator or a third thermoelectric module including a thermoelectric element.

In the embodiments in which the thermoelectric module is used as a cooling means in the present specification, it may be applied by replacing the thermoelectric module with an evaporator, for example, as follows.

(1) "Cold sink of thermoelectric module", "heat absorption surface of thermoelectric module" or "heat absorption side of thermoelectric module" may be interpreted as "evaporator or one side of the evaporator".

(2) "Heat absorption side of thermoelectric module" may be interpreted as the same meaning as "cold sink of thermoelectric module" or "heat absorption side of thermoelectric module".

(3) An electronic controller (processor) "applies or cuts off a constant voltage to the thermoelectric module" may be interpreted as the same meaning as being controlled to "supply or block a refrigerant to the evaporator", "control a switching valve to be opened or closed", or "control a compressor to be turned on or off".

(4) "Controlling the constant voltage applied to the thermoelectric module to increase or decrease" by the controller may be interpreted as the same meaning as "controlling an amount or flow rate of the refrigerant flowing in the evaporator to increase or decrease", "controlling allowing an opening degree of the switching valve to increase or decrease", or "controlling an output of the compressor to increase or decrease".

(5) "Controlling a reverse voltage applied to the thermoelectric module to increase or decrease" by the controller is interpreted as the same meaning as "controlling a voltage applied to the defrost heater adjacent to the evaporator to increase or decrease".

In the present specification, "storage compartment cooled by the thermoelectric module" is defined as a storage compartment A, and "fan located adjacent to the thermoelectric module so that air inside the storage compartment A is heat-exchanged with the heat absorption surface of the thermoelectric module" may be defined as "storage compartment fan A".

Also, a storage compartment cooled by the cooling device while constituting the refrigerator together with the storage compartment A may be defined as "storage compartment B".

In addition, a "cooling device chamber" may be defined as a space in which the cooling device is disposed, in a structure in which the fan for blowing cool air generated by the cooling device is added, the cooling device chamber may be defined as including a space in which the fan is accommodated, and in a structure in which a passage for guiding the cold air blown by the fan to the storage compartment or a passage through which defrost water is discharged is added may be defined as including the passages.

In addition, a defrost heater disposed at one side of the cold sink to remove frost or ice generated on or around the cold sink may be defined as a cold sink defrost heater.

In addition, a defrost heater disposed at one side of the heat sink to remove frost or ice generated on or around the heat sink may be defined as a heat sink defrost heater.

In addition, a defrost heater disposed at one side of the cooling device to remove frost or ice generated on or around the cooling device may be defined as a cooling device defrost heater.

In addition, a defrost heater disposed at one side of a wall surface forming the cooling device chamber to remove frost or ice generated on or around the wall surface forming the cooling device chamber may be defined as a cooling device chamber defrost heater.

In addition, a heater disposed at one side of the cold sink may be defined as a cold sink drain heater in order to minimize refreezing or re-implantation in the process of discharging defrost water or water vapor melted in or around the cold sink.

In addition, a heater disposed at one side of the heat sink may be defined as a heat sink drain heater in order to minimize refreezing or re-implantation in the process of discharging defrost water or water vapor melted in or around the heat sink.

In addition, a heater disposed at one side of the cooling device may be defined as a cooling device drain heater in order to minimize refreezing or re-implantation in the process of discharging defrost water or water vapor melted in or around the cooling device.

In addition, in the process of discharging the defrost water or water vapor melted from or around the wall forming the cooling device chamber, a heater disposed at one side of the wall forming the cooling device chamber may be defined as a cooling device chamber drain heater in order to minimize refreezing or re-implantation.

Also, a "cold sink heater" to be described below may be defined as a heater that performs at least one of a function of the cold sink defrost heater or a function of the cold sink drain heater.

In addition, the "heat sink heater" may be defined as a heater that performs at least one of a function of the heat sink defrost heater or a function of the heat sink drain heater.

In addition, the "cooling device heater" may be defined as a heater that performs at least one of a function of the cooling device defrost heater or a function of the cooling device drain heater.

In addition, a "back heater" to be described below may be defined as a heater that performs at least one of a function of the heat sink heater or a function of the cooling device chamber defrost heater. That is, the back heater may be defined as a heater that performs at least one function among the functions of the heat sink defrost heater, the heater sink drain heater, and the cooling device chamber defrost heater.

In the present invention, as an example, the first storage compartment may include a refrigerating compartment that is capable of being controlled to a zero temperature by the first cooling device.

In addition, the second storage compartment may include a freezing compartment that is capable of being controlled to a temperature below zero by the second cooling device.

In addition, the third storage compartment may include a deep freezing compartment that is capable of being maintained at a cryogenic temperature or an ultrafrezing temperature by the third cooling device.

In the present invention, a case in which all of the third to third storage compartments are controlled to a temperature below zero, a case in which all of the first to third storage compartments are controlled to a zero temperature, and a case in which the first and second storage compartments are controlled to the zero temperature, and the third storage compartment is controlled to the temperature below zero are not excluded.

In the present invention, an "operation" of the refrigerator may be defined as including four processes such as a process (I) of determining whether an operation start condition or an operation input condition is satisfied, a process (II) of performing a predetermined operation when the operation input condition is satisfied, a process (III) of determining whether an operation completion condition is satisfied, and a process (IV) of terminating the operation when the operation completion condition is satisfied.

In the present invention, an "operation" for cooling the storage compartment of the refrigerator may be defined by being divided into a normal operation and a special operation.

The normal operation may be referred to as a cooling operation performed when an internal temperature of the refrigerator naturally increases in a state in which the storage compartment door is not opened, or a load input condition due to food storage does not occur.

In detail, when the temperature of the storage compartment enters an unsatisfactory temperature region (described below in detail with reference to the drawings), and the operation input condition is satisfied, the controller controls the cold air to be supplied from the cooling device of the storage compartment so as to cool the storage compartment.

Specifically, the normal operation may include a refrigerating compartment cooling operation, a freezing compartment cooling operation, a deep freezing compartment cooling operation, and the like.

On the other hand, the special operation may mean an operation other than the operations defined as the normal operation.

In detail, the special operation may include a defrost operation controlled to supply heat to the cooling device so as to melt the frost or ice deposited on the cooling device after a defrost period of the storage compartment elapses.

In addition, the special operation may further include a load correspondence operation for controlling the cold air to be supplied from the cooling device to the storage compartment so as to remove a heat load penetrated into the storage compartment when a set time elapses from a time when a door of the storage compartment is opened and closed, or when a temperature of the storage compartment rises to a set temperature before the set time elapses.

In detail, the load correspondence operation includes a door load correspondence operation performed to remove a load penetrated into the storage compartment after opening and closing of the storage compartment door, and an initial cold start operation performed to remove a load correspondence operation performed to remove a load inside the storage compartment when power is first applied after installing the refrigerator.

For example, the defrost operation may include at least one of a refrigerating compartment defrost operation, a freezing compartment defrost operation, and a deep freezing compartment defrost operation.

Also, the door load correspondence operation may include at least one of a refrigerating compartment door load correspondence operation, a freezing compartment door load correspondence operation, and a deep freezing compartment load correspondence operation.

Here, the deep freezing compartment load correspondence operation may be interpreted as an operation for removing the deep freezing compartment load, which is performed when at least one condition of the deep freezing compartment door load correspondence input condition performed when the load increases due to the opening of the door of the deep freezing compartment, the initial cold start operation input condition preformed to remove the load within the deep freezing compartment when the deep freezing compartment is switched from an on state to an off state, or the operation input condition after the defrosting that initially stats after the deep freezing compartment defrost operation is completed.

In detail, determining whether the operation input condition corresponding to the load of the deep freezing compartment door is satisfied may include determining whether at least one of a condition in which a predetermined amount of time elapses from at time point at which at least one of the freezing compartment door and the deep freezing compartment door is closed after being opened, or a condition in which a temperature of the deep freezing compartment rises to a set temperature within a predetermined time is satisfied.

In addition, determining whether the initial cold start operation input condition of the deep freezing compartment is satisfied may include determining whether the refrigerator is powered on, and the deep freezing compartment mode is switched from the off state to the on state.

In addition, determining whether the operation input condition is satisfied after the deep freezing compartment defrost may include determining at least one of stopping of the reverse voltage applied to the thermoelectric module for cold sink heater off, back heater off, cold sink defrost, stopping of the constant voltage applied to the thermoelectric module for the heat sink defrost after the reverse voltage is applied for the cold sink defrost, an increase of a temperature of a housing accommodating the heat sink to a set temperature, or terminating of the freezing compartment defrost operation.

Thus, the operation of the storage compartment including at least one of the refrigerating compartment, the freezing compartment, or the deep freezing compartment may be summarized as including the normal storage compartment operation and the storage compartment special operation.

When two operations conflict with each other during the operation of the storage compartment described above, the controller may control one operation (operation A) to be performed preferentially and the other operation (operation B) to be paused.

In the present invention, the conflict of the operations may include i) a case in which an input condition of the operation A and an input condition of the operation B are satisfied at the same time to conflict with each other, a case in which the input condition of the operation B is satisfied while the input condition of the operation A is satisfied to perform the operation A to conflict with each other, and a case in which the input condition of operation A is satisfied while the input condition of the operation B is satisfied to perform the operation B to conflict with each other.

When the two operations conflict with each other, the controller determines the performance priority of the conflicting operations to perform a so-called "conflict control algorithm" to be executed in order to control the performance of the correspondence operation.

A case in which the operation A is performed first, and the operation B is stopped will be described as an example.

In detail, in the present invention, the paused operation B may be controlled to follow at least one of the three cases of the following example after the completion of the operation A.

a. Termination of Operation B

When the operation A is completed, the performance of the operation B may be released to terminate the conflict control algorithm and return to the previous operation process.

Here, the "release" does not determine whether the paused operation B is not performed any more, and whether the input condition of the operation B is satisfied. That is, it is seen that the determination information on the input condition of the operation B is initialized.

b. Redetermination of Input Condition of Operation B

When the firstly performed operation A is completed, the controller may return to the process of determining again whether the input condition of the paused operation B is satisfied, and determine whether the operation B restarts.

For example, if the operation B is an operation in which the fan is driven for 10 minutes, and the operation is stopped when 3 minutes elapses after the start of the operation due to the conflict with the operation A, it is determined again whether the input condition of the operation B is satisfied at a time point at which the operation A is completed, and if it is determined to be satisfied, the fan is driven again for 10 minutes.

c. Continuation of Operation B

When the firstly performed operation A is completed, the controller may allow the paused operation B to be continued. Here, "continuation" means not to start over from the beginning, but to continue the paused operation.

For example, if the operation B is an operation in which the fan is driven for 10 minutes, and the operation is paused after 3 minutes elapses after the start of the operation due to the conflict with operation A, the compressor is further driven for the remaining time of 7 minutes immediately after the operation A is completed.

In the present invention, the priority of the operations may be determined as follows.

First, when the normal operation and the special operation conflict with each other, it is possible to control the special operation to be performed preferentially.

Second, when the conflict between the normal operations occurs, the priority of the operations may be determined as follows.

I. When the refrigerating compartment cooling operation and the freezing compartment cooling operation conflict with each other, the refrigerating compartment cooling operation may be performed preferentially.

II. When the refrigerating compartment (or freezing compartment) cooling operation and the deep freezing compartment cooling operation conflict with each other, the refrigerating compartment (or freezing compartment) cooling operation may be performed preferentially. Here, in order to prevent the deep freezing compartment temperature from rising excessively, cooling capacity having a level lower than that of maximum cooling capacity of the deep freezing compartment cooling device may be supplied from the deep freezing compartment cooling device to the deep freezing compartment.

The cooling capacity may mean at least one of cooling capacity of the cooling device itself and an airflow amount of the cooling fan disposed adjacent to the cooling device. For example, when the cooling device of the deep freezing compartment is the thermoelectric module, the controller may perform the refrigerating compartment (or freezing compartment) cooling operation with priority when the refrigerating compartment (or freezing compartment) cooling operation and the deep freezing compartment cooling operation conflict with each other. Here, a voltage lower than a maximum voltage that is capable of being applied to the thermoelectric module may be input into the thermoelectric module.

Third, when the conflict between special operations occurs, the priority of the operations may be determined as follows.

I. When a refrigerating compartment door load correspondence operation conflicts with a freezing compartment door load correspondence operation, the controller may control the refrigerating compartment door load correspondence operation to be performed with priority.

II. When the freezing compartment door load correspondence operation conflicts with the deep freezing compartment door load correspondence operation, the controller may control the deep freezing compartment door load correspondence operation to be performed with priority.

III. If the refrigerating compartment operation and the deep freezing compartment door load correspondence operation conflict with each other, the controller may control the refrigerating compartment operation and the deep freezing compartment door load correspondence operation so as to be performed at the same time. Then, when the temperature of the refrigerating compartment reaches a specific temperature a, the controller may control the deep freezing compartment door load correspondence operation so as to be performed exclusively. When the refrigerating compartment temperature rises again to reach a specific temperature b (a<b) while the deep freezing compartment door load correspondence operation is performed independently, the controller may control the refrigerating compartment operation and the deep freezing compartment door load correspondence operation so as to be performed at the same time. Thereafter, an operation switching process between the simultaneous operation of the deep freezing compartment and the refrigerating compartment and the exclusive operation of the deep freezing compartment may be controlled to be repeatedly performed according to the temperature of the refrigerating compartment.

As an extended modified example, when the operation input condition of the deep freezing compartment load correspondence operation is satisfied, the controller may control the operation to be performed in the same manner as when the refrigerating compartment operation and the deep freezing compartment door load correspondence operation conflict with each other.

Hereinafter, as an example, the description is limited to the case in which the first storage compartment is the refrigerating compartment, the second storage compartment is the freezing compartment, and the third storage compartment is the deep freezing compartment.

FIG. 1 is a view illustrating a refrigerant circulation system of a refrigerator according to an embodiment of the present invention.

Referring to FIG. 1, a refrigerant circulation system according to an embodiment of the present invention includes a compressor 11 that compresses a refrigerant into a high-temperature and high-pressure gaseous refrigerant, a condenser 12 that condenses the refrigerant discharged from the compressor 11 into a high-temperature and high-pressure liquid refrigerant, an expansion valve that expands the refrigerant discharged from the condenser 12 into a low-temperature and low-pressure two-phase refrigerant, and an evaporator that evaporates the refrigerant passing through the expansion valve into a low-temperature and low-pressure gaseous refrigerant. The refrigerant discharged from the evaporator flows into the compressor 11. The above components are connected to each other by a refrigerant pipe to constitute a closed circuit.

In detail, the expansion valve may include a refrigerating compartment expansion valve 14 and a freezing compartment expansion valve 15. The refrigerant pipe is divided into two branches at an outlet side of the condenser 12, and the refrigerating compartment expansion valve 14 and the freezing compartment expansion valve 15 are respectively connected to the refrigerant pipe that is divided into the two branches. That is, the refrigerating compartment expansion valve 14 and the freezing compartment expansion valve 15 are connected in parallel at the outlet of the condenser 12.

A switching valve 13 is mounted at a point at which the refrigerant pipe is divided into the two branches at the outlet side of the condenser 12. The refrigerant passing through the condenser 12 may flow through only one of the refrigerating compartment expansion valve 14 and the freezing compartment expansion valve 15 by an operation of adjusting an opening degree of the switching valve 13 or may flow to be divided into both sides.

The switching valve 13 may be a three-way valve, and a flow direction of the refrigerant is determined according to an operation mode. Here, one switching valve such as the three-way valve may be mounted at an outlet of the condenser to control the flow direction of the refrigerant, or alternatively, the switching valves are mounted at inlet sides of a refrigerating compartment expansion valve 14 and a freezing compartment expansion valve 15, respectively.

As a first example of an evaporator arrangement manner, the evaporator may include a refrigerating compartment evaporator 16 connected to an outlet side of the refrigerating compartment expansion valve 14 and a heat sink and a freezing compartment evaporator 17, which are connected in series to an outlet side of the freezing compartment expansion valve 15. The heat sink 24 and the freezing compartment evaporator 17 are connected in series, and the refrigerant passing through the freezing compartment expansion valve passes through the heat sink 24 and then flows into the freezing compartment evaporator 17.

As a second example, the heat sink 24 may be disposed at an outlet side of the freezing compartment evaporator 17 so that the refrigerant passing through the freezing compartment evaporator 17 flows into the heat sink 24.

As a third example, a structure in which the heat sink 24 and the freezing compartment evaporator 17 are connected in parallel at an outlet end of the freezing compartment expansion valve 15 is not excluded.

Although the heat sink 24 is the evaporator, it is provided for the purpose of cooling a heat generation surface of the thermoelectric module to be described later, not for the purpose of heat-exchange with the cold air of the deep freezing compartment.

In each of the three examples described above with respect to the arrangement manner of the evaporator, a complex system of a first refrigerant circulation system, in which the switching valve 13, the refrigerating compartment expansion valve 14, and the refrigerating compartment evaporator 16 are removed, and a second refrigerant circulation system constituted by the refrigerating compartment cooling evaporator, the refrigerating compartment cooling expansion valve, the refrigerating compartment cooling condenser, and a refrigerating compartment cooling compressor is also possible. Here, the condenser constituting the first refrigerant circulation system and the condenser constituting the second refrigerant circulation system may be independently provided, and a complex condenser which is provided as a single body and in which the refrigerant is not mixed may be provided.

The refrigerant circulation system of the refrigerator having the two storage compartments including the deep freezing compartment may be configured only with the first refrigerant circulation system.

Hereinafter, as an example, the description will be limited to a structure in which the heat sink and the freezing compartment evaporator 17 are connected in series.

A condensing fan 121 is mounted adjacent to the condenser 12, a refrigerating compartment fan 161 is mounted adjacent to the refrigerating compartment evaporator 16, and a freezing compartment fan 171 is mounted adjacent to the freezing compartment evaporator 17.

A refrigerating compartment maintained at a refrigerating temperature by cold air generated by the refrigerating compartment evaporator 16, a freezing compartment maintained at a freezing temperature by cold air generated by the freezing compartment evaporator 16, and a deep freezing compartment 202 maintained at a cryogenic or ultrafrezing temperature by a thermoelectric module to be described later are formed inside the refrigerator provided with the refrigerant circulation system according to the embodiment of the present invention. The refrigerating compartment and the freezing compartment may be disposed adjacent to each other in a vertical direction or horizontal direction and are partitioned from each other by a partition wall. The deep freezing compartment may be provided at one side of the inside of the freezing compartment, but the present invention includes the deep freezing compartment provided at one side of the outside of the freezing compartment. In order to block the heat exchange between the cold air of the deep freezing compartment and the cold air of the freezing compartment, the deep freezing compartment 202 may be partitioned from the freezing compartment by a deep freezing case 201 having the high thermal insulation performance.

In addition, the thermoelectric module includes a thermoelectric module 21 having one side through which heat is absorbed and the other side through which heat is released when power is supplied, a cold sink 22 mounted on the heat absorption surface of the thermoelectric module 21, a heat sink mounted on the heat generation surface of the thermoelectric module 21, and an insulator 23 that blocks heat exchange between the cold sink 22 and the heat sink.

Here, the heat sink 24 is an evaporator that is in contact with the heat generation surface of the thermoelectric module 21. That is, the heat transferred to the heat generation surface of the thermoelectric module 21 is heat-exchanged with the refrigerant flowing inside the heat sink 24. The refrigerant flowing along the inside of the heat sink 24 and absorbing heat from the heat generation surface of the thermoelectric module 21 is introduced into the freezing compartment evaporator 17.

In addition, a cooling fan may be provided in front of the cold sink 22, and the cooling fan may be defined as the deep freezing compartment fan 25 because the fan is disposed behind the inside of the deep freezing compartment.

The cold sink 22 is disposed behind the inside of the deep freezing compartment 202 and configured to be exposed to the cold air of the deep freezing compartment 202. Thus, when the deep freezing compartment fan 25 is driven to forcibly circulate cold air in the deep freezing compartment 202, the cold sink 22 absorbs heat through heat-exchange with the cold air in the deep freezing compartment and then is transferred to the heat absorption surface of the thermoelectric module 21. The heat transferred to the heat absorption surface is transferred to the heat generation surface of the thermoelectric module 21.

The heat sink 24 functions to absorb the heat absorbed from the heat absorption surface of the thermoelectric module 21 and transferred to the heat generation surface of the thermoelectric module 21 again to release the heat to the outside of the thermoelectric module 20.

Figure 2:
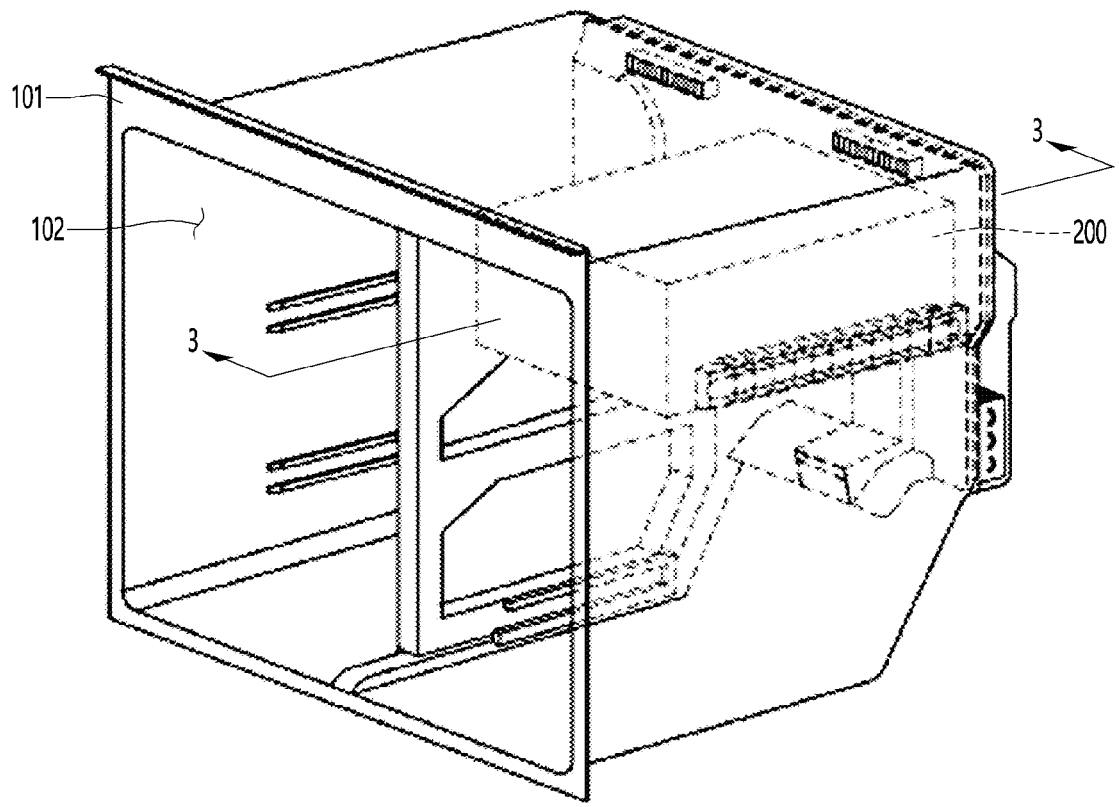
FIG. 2 is a perspective view illustrating structures of a freezing compartment and a deep freezing compartment of the refrigerator according to an embodiment of the present invention.
Figure 3:
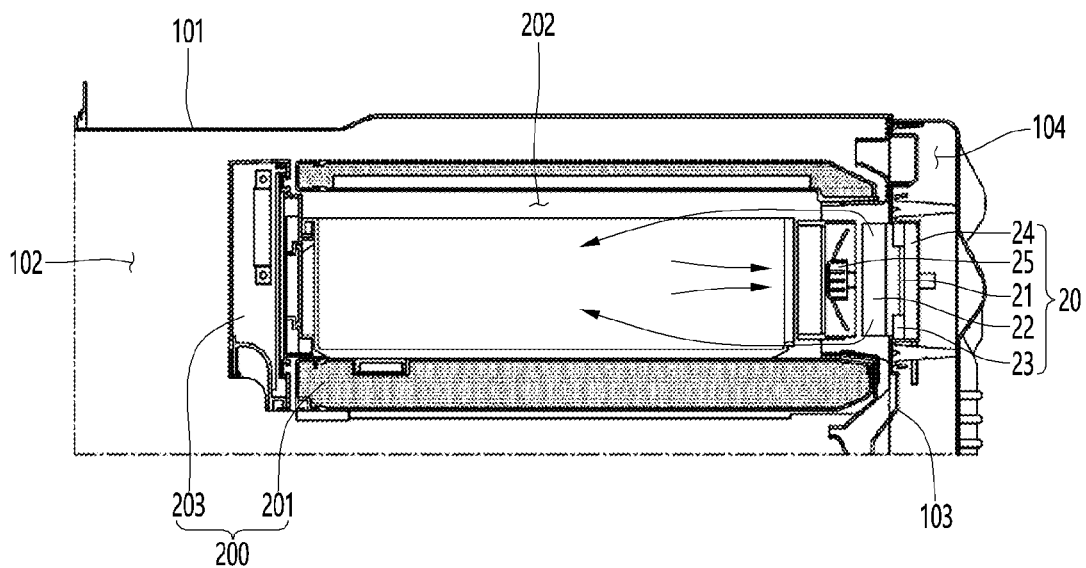
FIG. 3 is a longitudinal cross-sectional view taken along line 3-3 of FIG. 2.

FIG. 2 is a perspective view illustrating structures of the freezing compartment and the deep freezing compartment of the refrigerator according to an embodiment of the present invention, and FIG. 3 is a longitudinal cross-sectional view taken along line 3-3 of FIG. 2.

Referring to FIGS. 2 and 3, the refrigerator according to an embodiment of the present invention includes an inner case 101 defining the freezing compartment 102 and a deep freezing unit 200 mounted at one side of the inside of the freezing compartment 102.

In detail, the inside of the refrigerating compartment is maintained to a temperature of about 3° C., and the inside of the freezing compartment 102 is maintained to a temperature of about −18° C., whereas a temperature inside the deep freezing unit 200, i.e., an internal temperature of the deep freezing compartment 202 has to be maintained to about −50° C. Therefore, in order to maintain the internal temperature of the deep freezing compartment 202 at a cryogenic temperature of −50° C., an additional freezing means such as the thermoelectric module 20 is required in addition to the freezing compartment evaporator.

In more detail, the deep freezing unit 200 includes a deep freezing case 201 that forms a deep freezing compartment 202 therein, a deep freezing compartment drawer 203 slidably inserted into the deep freezing case 201, and a thermoelectric module 20 mounted on a rear surface of the deep freezing case 201.

Instead of applying the deep freezing compartment drawer 203, a structure in which a deep freezing compartment door is connected to one side of the front side of the deep freezing case 201, and the entire inside of the deep freezing compartment 201 is configured as a food storage space is also possible.

In addition, the rear surface of the inner case 101 is stepped backward to form a freezing evaporation compartment 104 in which the freezing compartment evaporator 17 is accommodated. In addition, an inner space of the inner case 101 is divided into the freezing evaporation compartment 104 and the freezing compartment 102 by the partition wall 103. The thermoelectric module 20 is fixedly mounted on a front surface of the partition wall 103, and a portion of the thermoelectric module 20 passes through the deep freezing case 201 and is accommodated in the deep freezing compartment 202.

In detail, the heat sink 24 constituting the thermoelectric module 20 may be an evaporator connected to the freezing compartment expansion valve 15 as described above. A space in which the heat sink 24 is accommodated may be formed in the partition wall 103.

Since the two-phase refrigerant cooled to a temperature of about −18° C. to −20° C. while passing through the freezing compartment expansion valve 15 flows inside the heat sink 24, a surface temperature of the heat sink 24 may be maintained to a temperature of −18° C. to −20° C. Here, it is noted that a temperature and pressure of the refrigerant passing through the freezing compartment expansion valve 15 may vary depending on the freezing compartment temperature condition.

When a rear surface of the thermoelectric module 21 is in contact with a front surface of the heat sink 24, and power is applied to the thermoelectric module 21, the rear surface of the thermoelectric module 21 becomes a heat generation surface.

When the cold sink 22 is in contact with a front surface of the thermoelectric module, and power is applied to the thermoelectric module 21, the front surface of the thermoelectric module 21 becomes a heat absorption surface.

The cold sink 22 may include a heat conduction plate made of an aluminum material and a plurality of heat exchange fins extending from a front surface of the heat conduction plate. Here, the plurality of heat exchange fins extend vertically and are disposed to be spaced apart from each other in a horizontal direction.

Here, when a housing surrounding or accommodating at least a portion of a heat conductor constituted by the heat conduction plate and the heat exchange fin is provided, the cold sink 22 has to be interpreted as a heat transfer member including the housing as well as the heat conductor. This is equally applied to the heat sink 22, and the heat sink 22 has be interpreted not only as the heat conductor constituted by the heat conduction plate and the heat exchange fin, but also as the heat transfer member including the housing when a housing is provided.

The deep freezing compartment fan 25 is disposed in front of the cold sink 22 to forcibly circulate air inside the deep freezing compartment 202.

Hereinafter, efficiency and cooling capacity of the thermoelectric module will be described.

The efficiency of the thermoelectric module 20 may be defined as a coefficient of performance (COP), and an efficiency equation is as follows.

$$COP = \frac{Q_c}{P_e}$$

Qc: Cooling Capacity (ability to absorb heat)
Pe: Input Power)

$$P_e = V \times i$$

In addition, the cooling capacity of the thermoelectric module 20 may be defined as follows.

$$Q_c = \alpha T_c i - \frac{1}{2}\frac{\rho L}{A}i^2 - \frac{kA}{L}(T_h - T_c)$$

<Semiconductor Material Property Coefficient>
  α: Seebeck Coefficient [V/K]
  ρ: Specific Resistance [Ωm−1]
  k: Thermal Conductivity [W/mk]
<Semiconductor Structure Characteristics>
  L: Thickness of thermoelectric module: Distance between heat absorption surface and heat generation surface
  A: Surface of thermoelectric module
<System use Condition>
  i: Current
  V: Voltage
  Th: Temperature of heat generation surface of thermoelectric module
  Tc: Temperature of heat absorption surface of thermoelectric module In the above cooling capacity equation, a first item at the right may be defined as a Peltier Effect and may be defined as an amount of heat transferred between both ends of the heat absorption surface and the heat generation surface by a voltage difference. The Peltier effect increases in proportional to supply current as a function of current.

In the formula V=iR, since a semiconductor constituting the thermoelectric module acts as resistance, and the resistance may be regarded as a constant, it may be said that a voltage and current have a proportional relationship. That is, when the voltage applied to the thermoelectric module 21 increases, the current also increases. Accordingly, the Peltier effect may be seen as a current function or as a voltage function.

The cooling capacity may also be seen as a current function or a voltage function. The Peltier effect acts as a positive effect of increasing in cooling capacity. That is, as the supply voltage increases, the Peltier effect increases to increase in cooling capacity.

The second item in the cooling capacity equation is defined as a Joule Effect.

The Joule effect means an effect in which heat is generated when current is applied to a resistor. In other words, since heat is generated when power is supplied to the thermoelectric module, this acts as a negative effect of reducing the cooling capacity. Therefore, when the voltage supplied to the thermoelectric module increases, the Joule effect increases, resulting in lowering of the cooling capacity of the thermoelectric module.

The third item in the cooling capacity equation is defined as a Fourier effect.

The Fourier effect means an effect in which heat is transferred by heat conduction when a temperature difference occurs on both surfaces of the thermoelectric module.

In detail, the thermoelectric module includes a heat absorption surface and a heat generation surface, each of which is provided as a ceramic substrate, and a semiconductor disposed between the heat absorption surface and the heat generation surface. When a voltage is applied to the thermoelectric module, a temperature difference is generated between the heat absorption surface and the heat generation surface. The heat absorbed through the heat absorption surface passes through the semiconductor and is transferred to the heat generation surface. However, when the temperature difference between the heat absorption surface and the heat absorption surface occurs, a phenomenon in which heat flows backward from the heat generation surface to the heat absorption surface by heat conduction occurs, which is referred to as the Fourier effect.

Like the Joule effect, the Fourier effect acts as a negative effect of lowering the cooling capacity. In other words, when the supply current increases, the temperature difference (Th−Tc) between the heat generation surface and the heat absorption surface of the thermoelectric module, i.e., a value ΔT, increases, resulting in lowering of the cooling capacity.

Figure 4:
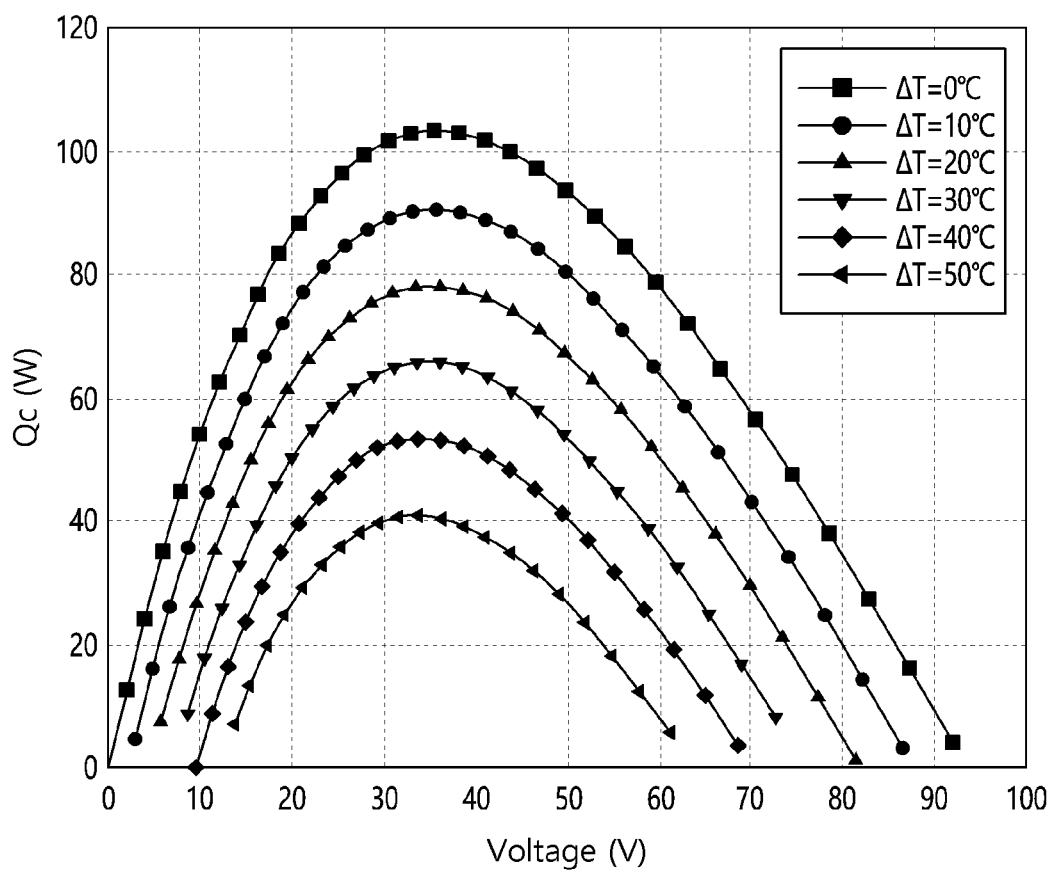
FIG. 4 is a graph illustrating a relationship of cooling capacity with respect to an input voltage and a Fourier effect.

FIG. 4 is a graph illustrating a relationship of cooling capacity with respect to the input voltage and the Fourier effect.

Referring to FIG. 4, the Fourier effect may be defined as a function of the temperature difference between the heat absorption surface and the heat generation surface, that is, a value ΔT.

In detail, when standards of the thermoelectric module are determined, values k, A, and L in the item of the Fourier effect in the above cooling capacity equation become constant values, and thus, the Fourier effect may be seen as a function with the value ΔT as a variable.

Therefore, as the value ΔT increases, the value of the Fourier effect increases, but the Fourier effect acts as a negative effect on the cooling capacity, and thus the cooling capacity decreases.

As shown in the graph of FIG. 4, it is seen that the greater the value ΔT under the constant voltage condition, the less the cooling capacity.

In addition, when the value ΔT is fixed, for example, when ΔT is 30° C., a change in cooling capacity according to a change of the voltage is observed. As the voltage value increases, the cooling capacity increases and has a maximum value at a certain point and then decreases again.

Here, since the voltage and current have a proportional relationship, it should be noted that it is no matter to view the current described in the cooling capacity equation as the voltage and be interpreted in the same manner.

In detail, the cooling capacity increases as the supply voltage (or current) increases, which may be explained by the above cooling capacity equation. First, since the value ΔT is fixed, the value ΔT becomes a constant. Since the ΔT value for each standard of the thermoelectric module is determined, an appropriate standard of the thermoelectric module may be set according to the required value ΔT.

Since the value ΔT is fixed, the Fourier effect may be seen as a constant, and the cooling capacity may be simplified into a function of the Peltier effect, which is seen as a first-order function of the voltage (or current), and the Joule effect, which is seen as a second-order function of the voltage (or current).

As the voltage value gradually increases, an amount of increase in Peltier effect, which is the first-order function of the voltage, is larger than that of increase in Joule effect, which is the second-order function, of voltage, and consequently, the cooling capacity increases. In other words, until the cooling capacity is maximized, the function of the Joule effect is close to a constant, so that the cooling capacity approaches the first-order function of the voltage.

As the voltage further increases, it is seen that a reversal phenomenon, in which a self-heat generation amount due to the Joule effect is greater than a transfer heat amount due to the Peltier effect, occurs, and as a result, the cooling capacity decreases again. This may be more clearly understood from the functional relationship between the Peltier effect, which is the first-order function of the voltage (or current), and the Joule effect, which is the second-order function of the voltage (or current). That is, when the cooling capacity decreases, the cooling capacity is close to the second-order function of the voltage.

In the graph of FIG. 4, it is confirmed that the cooling capacity is maximum when the supply voltage is in a range of about 30 V to about 40 V, more specifically, about 35 V. Therefore, if only the cooling capacity is considered, it is said that it is preferable to generate a voltage difference within a range of 30 V to 40V in the thermoelectric module.

Figure 5:
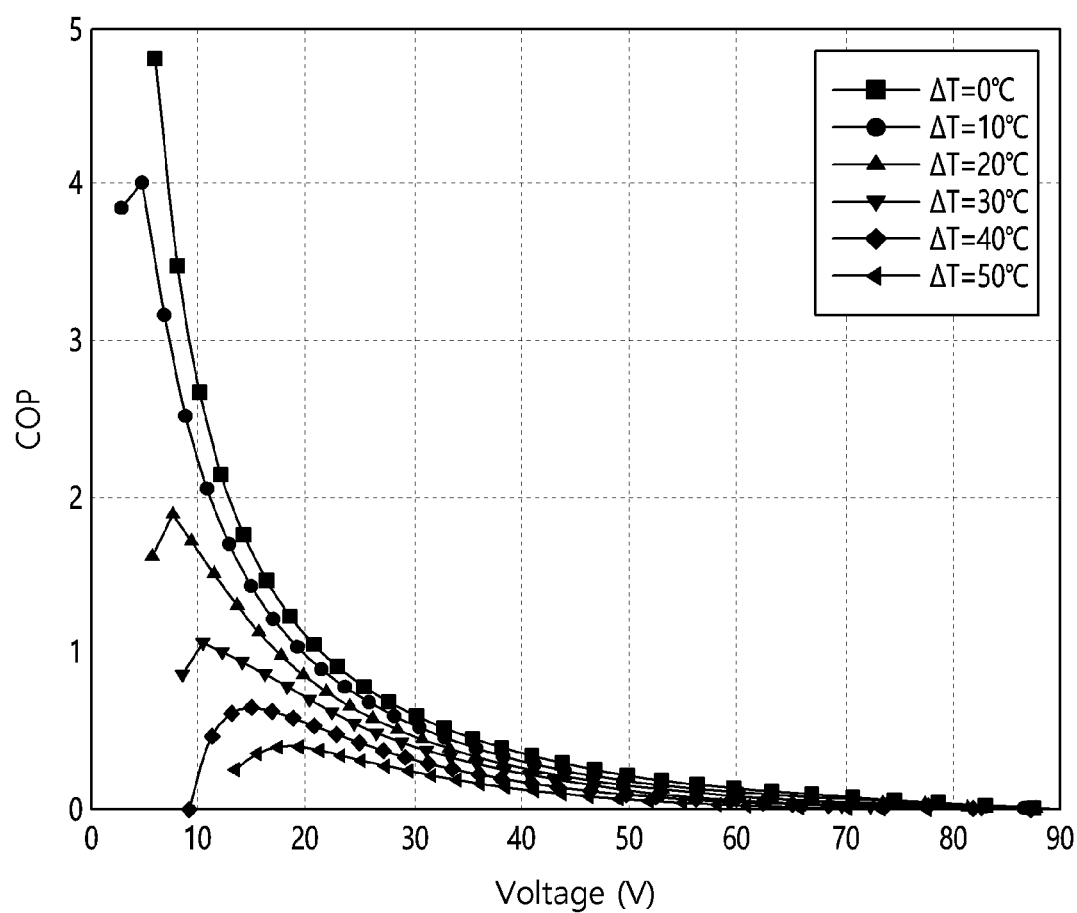
FIG. 5 is a graph illustrating a relationship of efficiency with respect to an input voltage and a Fourier effect.

FIG. 5 is a graph illustrating a relationship of efficiency with respect to the input voltage and the Fourier effect.

Referring to FIG. 5, it is seen that the higher the value ΔT, the lower the efficiency at the same voltage. This will be noted as a natural result because the efficiency is proportional to the cooling capacity.

In addition, when the value ΔT is fixed, for example, when the value ΔT is limited to 30° C. and the change in efficiency according to the change in voltage is observed, the efficiency increases as the supply voltage increases, and the efficiency decreases after a certain time point elapses. This is said to be similar to the graph of the cooling capacity according to the change of the voltage.

Here, the efficiency (COP) is a function of input power as well as cooling capacity, and the input Pe becomes a function of V2 when the resistance of the thermoelectric module 21 is considered as the constant. If the cooling capacity is divided by V2, the efficiency may be expressed as Peltier effect—Peltier effect/V2. Therefore, it is seen that the graph of the efficiency has a shape as illustrated in FIG. 5.

It is seen from the graph of FIG. 5, in which a point at which the efficiency is maximum appears in a region in which the voltage difference (or supply voltage) applied to the thermoelectric module is less than about 20 V. Therefore, when the required value ΔT is determined, it is good to apply an appropriate voltage according to the value to maximize the efficiency. That is, when a temperature of the heat sink and a set temperature of the deep freezing compartment 202 are determined, the value ΔT is determined, and accordingly, an optimal difference of the voltage applied to the thermoelectric module may be determined.

Figure 6:
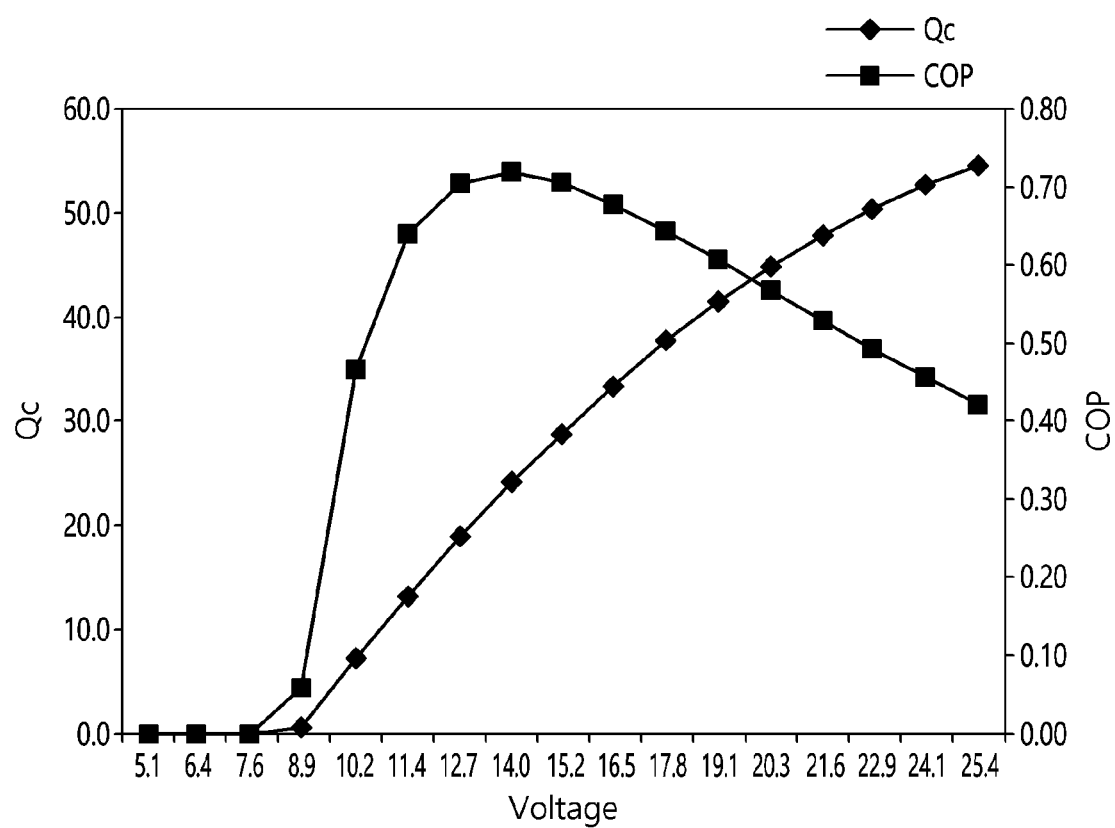
FIG. 6 is a graph illustrating a relationship of cooling capacity and efficiency according to a voltage.

FIG. 6 is a graph illustrating a relationship of the cooling capacity and the efficiency according to a voltage.

Referring to FIG. 6, as described above, as the voltage difference increases, both the cooling capacity and efficiency increase and then decrease.

In detail, it is seen that the voltage value at which the cooling capacity is maximized and the voltage value at which the efficiency is maximized are different from each other. This is seen that the voltage is the first-order function, and the efficiency is the second-order function until the cooling capacity is maximized.

As illustrated in FIG. 6, as an example, in the case of the thermoelectric module having ΔT of 30° C., it is confirmed that the thermoelectric module has the highest efficiency within a range of approximately 12 V to 17 V of the voltage applied to the thermoelectric module. Within the above voltage range, the cooling capacity continues to increase. Therefore, it is seen that a voltage difference of at least 12 V is required in consideration of the cooling capacity, and the efficiency is maximum when the voltage difference is 14 V.

Figure 7:
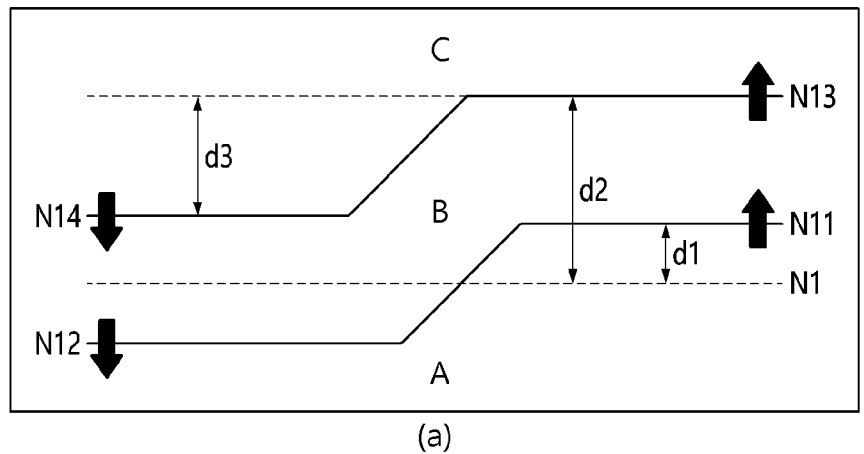
FIG. 7 is a view illustrating a reference temperature line for controlling a refrigerator according to a change in load inside the refrigerator.
Figure 7:
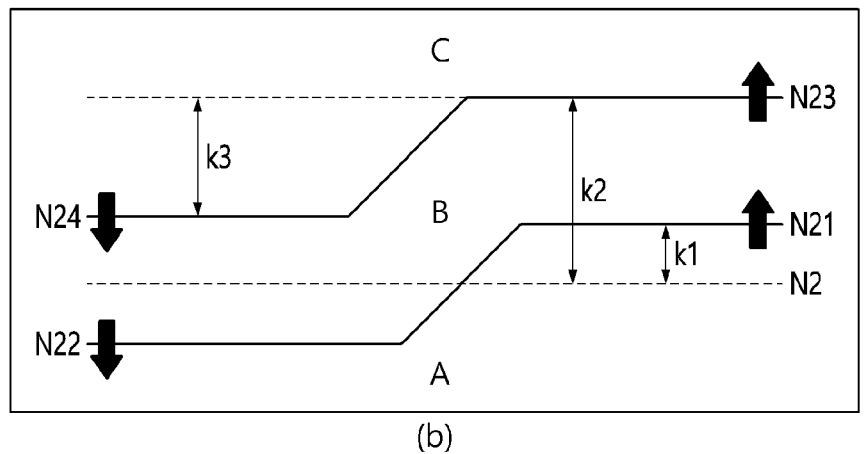
Figure 7:
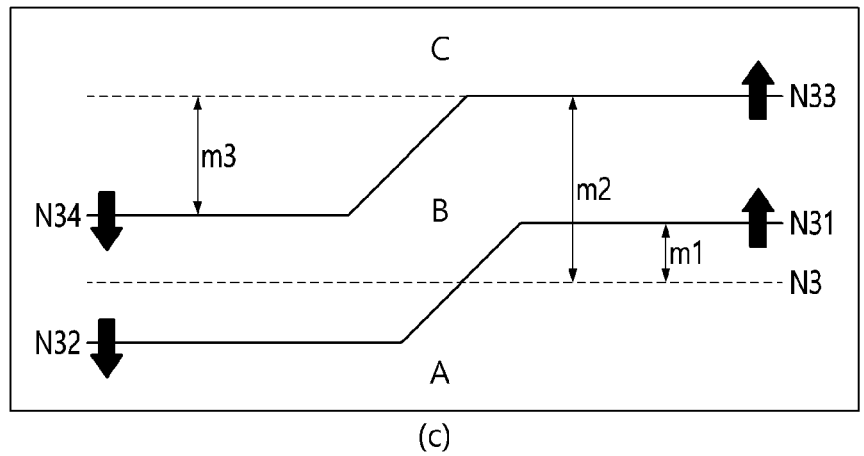

FIG. 7 is a view illustrating a reference temperature line for controlling the refrigerator according to a change in load inside the refrigerator.

Hereinafter, a set temperature of each storage compartment will be described by being defined as a notch temperature. The reference temperature line may be expressed as a critical temperature line.

A lower reference temperature line in the graph is a reference temperature line by which a satisfactory temperature region and a unsatisfactory temperature region are divided. Thus, a region A below the lower reference temperature line may be defined as a satisfactory section or a satisfactory region, and a region B above the lower reference temperature line may be defined as a dissatisfied section or a dissatisfied region.

In addition, an upper reference temperature line is a reference temperature line by which an unsatisfactory temperature region and an upper limit temperature region are divided. Thus, a region C above the upper reference temperature line may be defined as an upper limit region or an upper limit section and may be seen as a special operation region.

When defining the satisfactory/unsatisfactory/upper limit temperature regions for controlling the refrigerator, the lower reference temperature line may be defined as either a case of being included in the satisfactory temperature region or a case of being included in the unsatisfactory temperature region. In addition, the upper reference temperature line may be defined as one of a case of being included in the unsatisfactory temperature region and a case of being included in the upper limit temperature region.

When the internal temperature of the refrigerator is within the satisfactory region A, the compressor is not driven, and when the internal temperature of the refrigerator is in the unsatisfactory region B, the compressor is driven so that the internal temperature of the refrigerator is within the satisfactory region.

In addition, when the internal temperature of the refrigerator is in the upper limit region C, it is considered that food having a high temperature is put into the refrigerator, or the door of the storage compartment is opened to rapidly increase in load within the refrigerator. Thus, a special operation algorithm including a load correspondence operation is performed.

(a) of FIG. 7 is a view illustrating a reference temperature line for controlling the refrigerator according to a change in temperature of the refrigerating compartment.

A notch temperature N1 of the refrigerating compartment is set to a temperature above zero. In order to allow the temperature of the refrigerating compartment to be maintained to the notch temperature N1, when the temperature of the refrigerating compartment rises to a first satisfactory critical temperature N11 higher than the notch temperature N1 by a first temperature difference d1, the compressor is controlled to be driven, and after the compressor is driven, the compressor is controlled to be stopped when the temperature is lowered to a second satisfactory critical temperature N12 lower than the notch temperature N1 by the first temperature difference d1.

The first temperature difference d1 is a temperature value that increases or decreases from the notch temperature N1 of the refrigerating compartment, and the temperature of the refrigerating compartment may be defined as a control differential or a control differential temperature, which defines a temperature section in which the temperature of the refrigerating compartment is considered as being maintained to the notch temperature N1, i.e., approximately 1.5° C.

In addition, when it is determined that the refrigerating compartment temperature rises from the notch temperature N1 to a first unsatisfactory critical temperature N13 which is higher by the second temperature difference d2, the special operation algorithm is controlled to be executed. The second temperature difference d2 may be 4.5° C. The first unsatisfactory critical temperature may be defined as an upper limit input temperature.

After the special driving algorithm is executed, if the internal temperature of the refrigerator is lowered to a second unsatisfactory temperature N14 lower than the first unsatisfactory critical temperature by a third temperature difference d3, the operation of the special driving algorithm is ended. The second unsatisfactory temperature N14 may be lower than the first unsatisfactory temperature N13, and the third temperature difference d3 may be 3.0° C. The second unsatisfactory critical temperature N14 may be defined as an upper limit release temperature.

After the special operation algorithm is completed, the cooling capacity of the compressor is adjusted so that the internal temperature of the refrigerator reaches the second satisfactory critical temperature N12, and then the operation of the compressor is stopped.

(b) of FIG. 7 is a view illustrating a reference temperature line for controlling the refrigerator according to a change in temperature of the freezing compartment.

A reference temperature line for controlling the temperature of the freezing compartment have the same temperature as the reference temperature line for controlling the temperature of the refrigerating compartment, but the notch temperature N2 and temperature variations k1, k2, and k3 increasing or decreasing from the notch temperature N2 are only different from the notch temperature N1 and temperature variations d1, d2, and d3.

The freezing compartment notch temperature N2 may be −18° C. as described above, but is not limited thereto. The control differential temperature k1 defining a temperature section in which the freezing compartment temperature is considered to be maintained to the notch temperature N2 that is the set temperature may be 2° C.

Thus, when the freezing compartment temperature increases to the first satisfactory critical temperature N21, which increases by the first temperature difference k1 from the notch temperature N2, the compressor is driven, and when the freezing compartment temperature is the unsatisfactory critical temperature (upper limit input temperature) N23, which increases by the second temperature difference k2 than the notch temperature N2, the special operation algorithm is performed.

In addition, when the freezing compartment temperature is lowered to the second satisfactory critical temperature N22 lower than the notch temperature N2 by the first temperature difference k1 after the compressor is driven, the driving of the compressor is stopped.

After the special operation algorithm is performed, if the freezing compartment temperature is lowered to the second unsatisfactory critical temperature (upper limit release temperature) N24 lower by the third temperature difference k3 than the first unsatisfactory temperature N23, the special operation algorithm is ended. The temperature of the freezing compartment is lowered to the second satisfactory critical temperature N22 through the control of the compressor cooling capacity.

Even in the state that the deep freezing compartment mode is turned off, it is necessary to intermittently control the temperature of the deep freezing compartment with a certain period to prevent the deep freezing compartment temperature from excessively increasing. Thus, the temperature control of the deep freezing compartment in a state in which the deep freezing compartment mode is turned off follows the temperature reference line for controlling the temperature of the freezing compartment disclosed in (b) FIG. 7.

As described above, the reason why the reference temperature line for controlling the temperature of the freezing compartment is applied in the state in which the deep freezing compartment mode is turned off is because the deep freezing compartment is disposed inside the freezing compartment.

That is, even when the deep freezing compartment mode is turned off, and the deep freezing compartment is not used, the internal temperature of the deep freezing compartment has to be maintained at least at the same level as the freezing compartment temperature to prevent the load of the freezing compartment from increasing.

Therefore, in the state that the deep freezing compartment mode is turned off, the deep freezing compartment notch temperature is set equal to the freezing compartment notch temperature N2, and thus the first and second satisfactory critical temperatures and the first and second unsatisfactory critical temperatures are also set equal to the critical temperatures N21, N22, N23, and N24 for controlling the freezing compartment temperature.

(c) of FIG. 7 is a view illustrating a reference temperature line for controlling the refrigerator according to a change in temperature of the deep freezing compartment in a state in which the deep freezing compartment mode is turned on.

In the state in which the deep freezing compartment mode is turned on, that is, in the state in which the deep freezing compartment is on, the deep freezing compartment notch temperature N3 is set to a temperature significantly lower than the freezing compartment notch temperature N2, i.e., is in a range of about −45° C. to about −55° C., preferably −55° C. In this case, it is said that the deep freezing compartment notch temperature N3 corresponds to a heat absorption surface temperature of the thermoelectric module 21, and the freezing compartment notch temperature N2 corresponds to a heat generation surface temperature of the thermoelectric module 21.

Since the refrigerant passing through the freezing compartment expansion valve 15 passes through the heat sink 24, the temperature of the heat generation surface of the thermoelectric module 21 that is in contact with the heat sink 24 is maintained to a temperature corresponding to the temperature of the refrigerant passing through at least the freezing compartment expansion valve. Therefore, a temperature difference between the heat absorption surface and the heat generation surface of the thermoelectric module, that is, $\Delta T$ is 32° C.

The control differential temperature m1, that is, the deep freezing compartment control differential temperature that defines a temperature section considered to be maintained to the notch temperature N3, which is the set temperature, is set higher than the freezing compartment control differential temperature k1, for example, 3° C.

Therefore, it is said that the set temperature maintenance consideration section defined as a section between the first satisfactory critical temperature N31 and the second satisfactory critical temperature N32 of the deep freezing compartment is wider than the set temperature maintenance consideration section of the freezing compartment.

In addition, when the deep freezing compartment temperature rises to the first unsatisfactory critical temperature N33, which is higher than the notch temperature N3 by the second temperature difference m2, the special operation algorithm is performed, and after the special operation algorithm is performed, when the deep freezing compartment temperature is lowered to the second unsatisfactory critical temperature N34 lower than the first unsatisfactory critical temperature N33 by the third temperature difference m3, the special operation algorithm is ended. The second temperature difference m2 may be 5° C.

Here, the second temperature difference m2 of the deep freezing compartment is set higher than the second temperature difference k2 of the freezing compartment. In other words, an interval between the first unsatisfactory critical temperature N33 and the deep freezing compartment notch temperature N3 for controlling the deep freezing compartment temperature is set larger than that between the first unsatisfactory critical temperature N23 and the freezing compartment notch temperature N2 for controlling the freezing compartment temperature.

This is because the internal space of the deep freezing compartment is narrower than that of the freezing compartment, and the thermal insulation performance of the deep freezing case 201 is excellent, and thus, a small amount of the load input into the deep freezing compartment is discharged to the outside. In addition, since the temperature of the deep freezing compartment is significantly lower than the temperature of the freezing compartment, when a heat load such as food is penetrated into the inside of the deep freezing compartment, reaction sensitivity to the heat load is very high.

For this reason, when the second temperature difference m2 of the deep freezing compartment is set to be the same as the second temperature difference k2 of the freezing compartment, frequency of performance of the special operation algorithm such as a load correspondence operation may be excessively high. Therefore, in order to reduce power consumption by lowering the frequency of performance of the special operation algorithm, it is preferable to set the second temperature difference m2 of the deep freezing compartment to be larger than the second temperature difference k2 of the freezing compartment.

A method for controlling the refrigerator according to an embodiment of the present invention will be described below.

Hereinafter, the content that a specific process is performed when at least one of a plurality of conditions is satisfied should be construed to include the meaning that any one, some, or all of a plurality of conditions have to be satisfied to perform a particular process in addition to the meaning of performing the specific process if any one of the plurality of conditions is satisfied at a time point of determination by the controller.

Figure 8:
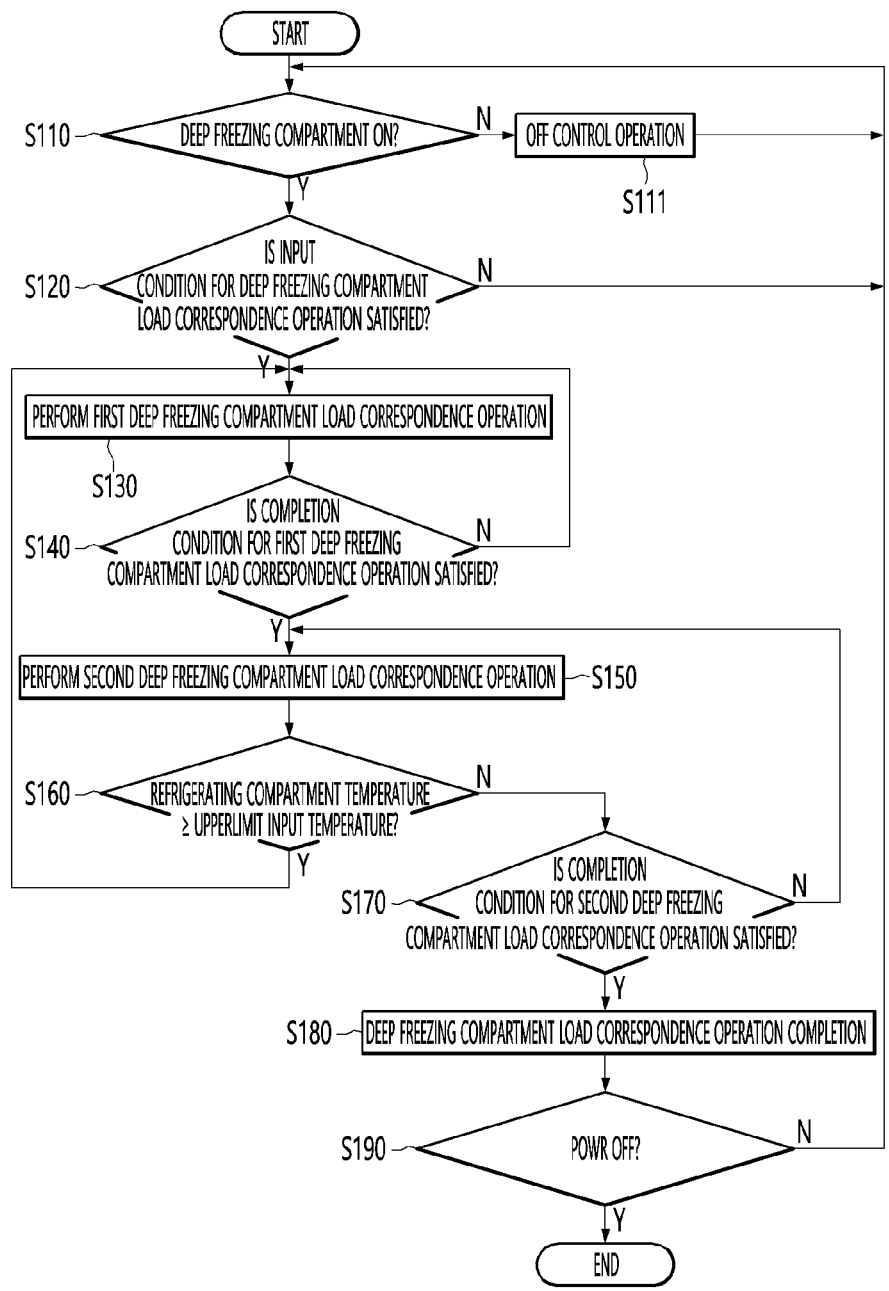
FIG. 8 is a flowchart illustrating a method for controlling a deep freezing compartment load correspondence operation according to an embodiment of the present invention.

FIG. 8 is a flowchart illustrating a method for controlling a deep freezing compartment load correspondence operation according to an embodiment of the present invention.

Hereinafter, a deep freezing compartment load correspondence operation and a deep freezing compartment load removing operation have to be interpreted as the same meaning.

Referring to FIG. 8, when the deep freezing compartment load correspondence operation starts, a controller determines whether a deep freezing compartment mode is in an on state at present (S110).

If it is determined that the deep freezing compartment mode is in an off state at present, a so-called an "off control operation" is performed (S111).

In detail, when the deep freezing compartment mode is in the off state, it means that a deep freezing compartment function is not being used at present. The off control operation may be defined as a control operation for maintaining an internal temperature of the deep freezing compartment as the freezing compartment temperature when the deep freezing compartment mode is in the off state.

In the state in which the deep freezing compartment mode is in the on state, the deep freezing compartment temperature is controlled to maintain the deep freezing compartment temperature to its original set temperature, that is, at a level of −50° C. However, in order to minimize power consumption in the state in which the deep freezing compartment mode is in the off state and prevent a freezing compartment load from increasing, the deep freezing compartment temperature is controlled to be maintained at the same temperature as the freezing compartment temperature.

For this, when the off control operation is performed, a deep freezing compartment temperature sensor is turned on for a certain period to detect the deep freezing compartment temperature, and if it is determined that the deep freezing compartment temperature is higher than the freezing compartment temperature, a deep freezing compartment fan is driven at a set speed for a set time On the other hand, if it is determined that the deep freezing compartment mode is in the on state, it is determined whether an input condition for the deep freezing compartment load correspondence operation is satisfied (S120).

In detail, a condition for starting the deep freezing compartment load correspondence operation are as follows.

First, there is a case in which the temperature of the deep freezing compartment increases by more than a set temperature $T_a$ for a set time $t_a$ after a freezing door is opened. The set time $t_a$ may be 5 minutes, and the set temperature $T_a$ may be 5° C., but is not limited thereto.

Here, it is interpreted as "during the set time $t_a$ after opening the door" may be interpreted as "for the set time $t_a$ from a time point at which the door is opened", and "for the set time $t_a$ from a time point at which the door is closed after opening the door".

If a sensor for detecting an opening of a deep freezing compartment drawer is provided, it may be a condition that the deep freezing compartment temperature increases by more than the set temperature $T_a$ for the set time $t_a$ after opening the deep freezing compartment drawer. The deep freezing compartment door and the deep freezing compartment drawer may be understood as the same concept.

Second, there is a case in which the deep freezing compartment temperature is in an upper limit temperature region (above a first unsatisfactory critical temperature). Here, when both the first and second conditions are satisfied, it may be set so that the operation corresponding to the deep freezing compartment load is input.

Third, a case in which a first cycle starts after freezing compartment defrost or deep freezing compartment defrost.

In a structure in which the deep freezing compartment is accommodated in the freezing compartment, and the freezing compartment evaporator and the heat sink of the thermoelectric module are connected in series, it is advantageous that the freezing compartment defrost and the deep freezing compartment defrost are performed together with each other.

In other words, if at least one of the freezing compartment defrost condition and the deep freezing compartment defrost condition is satisfied, the freezing compartment defrost and the deep freezing compartment defrost may start at the same time or may start with a time difference so that a simultaneous defrost operation section exists.

This is because, in the case of exclusive defrost of the deep freezing compartment, water or wet steam generated during the defrost process of the deep freezing compartment may flow into the freezing evaporator and be re-attached to the surface of the freezing compartment evaporator or an inner wall of the freezing evaporation compartment and then be frozen. This is because, in the case of exclusive defrost of the freezing compartment, water or wet steam generated during the defrost process of the freezing compartment may flow into the deep freezing compartment and may be attached to the inner wall of the deep freezing compartment or the cold sink of the thermoelectric module and then be frozen.

In addition, in the case of the refrigerating compartment cooled by the refrigerating compartment evaporator connected in parallel with the freezing compartment evaporator, the defrost operation start condition may be controlled to be performed when the freezing compartment defrost operation start condition is satisfied.

In general, for the refrigerating compartment defrost, a natural defrost operation, in which a defrost heater is not driven, and the refrigerating compartment fan rotates at a low speed to melt frost or ice generated on the refrigerating compartment evaporator by a heat load input to the refrigerating compartment from the outside, is applied. Of course, the refrigerant is not supplied to the refrigerating compartment evaporator during the defrost operation.

As described above, when the freezing compartment defrost operation condition is satisfied, the refrigerating compartment defrost operation is also performed, so eventually, when either one of the freezing compartment defrost and the deep freezing compartment defrost conditions is satisfied, all the refrigerating compartment, the freezing compartment, and the deep freezing compartment defrost are performed together with each other.

In addition, in order to perform the refrigerating compartment defrost operation, since the freezing compartment defrost operation condition has to be satisfied, it may be said that the exclusive defrost operation of the refrigerating compartment may not be performed, but is not necessarily limited thereto. That is, it should be noted that if the conditions for starting the refrigerating compartment defrost operation are set differently, the exclusive defrost operation of the refrigerating compartment may also be possible.

When the freezing compartment defrost operation is performed, the deep freezing compartment defrost operation will also be performed, and when all of the defrost operations are completed, the temperature inside each of the freezing compartment and the deep freezing compartment is highly likely to be in the upper limit temperature range. That is, there is high possibility that the deep freezing compartment load is in a very increasing state. For this reason, when a first cycle starts after the freezing compartment defrost operation is ended, the deep freezing compartment load correspondence operation is performed.

Fourth, there may be a case in which the deep freezing compartment mode is switched from an off state to an on state.

In the state in which the deep freezing compartment mode is in the off state, as described above, the deep freezing compartment temperature is maintained to the freezing compartment temperature. In this state, if the deep freezing compartment is switched to the on state, it is necessary to rapidly cool the deep freezing compartment from the freezing compartment temperature to the extremely low temperature that is set in the deep freezing compartment.

Fifth, there may be a case in which power of the refrigerator is changed from a turn-off state to a turn-on state.

In detail, for example, a case in which power is initially applied after the refrigerator is installed, or a case in which power of the refrigerator remains in the turn-off state due to the power outage or other reasons, and then the power is supplied to the refrigerator again.

In this case, since it is highly likely that the internal temperature of the refrigerator is maintained at the same level as the room temperature, the deep freezing compartment load correspondence operation may be performed to quickly remove the load of the deep freezing compartment having the lowest set temperature.

Here, the deep freezing compartment load correspondence operation may include a first deep freezing compartment load correspondence operation mode and a second deep freezing compartment load correspondence operation mode.

If at least one of five conditions presented above is satisfied, the first deep freezing compartment load correspondence operation is performed (S130). If none of the above five conditions is satisfied, the process (S110) of determining whether the deep freezing compartment mode is in the on state is repeatedly performed while the normal control operation is performed.

The first deep freezing compartment load correspondence operation refers to an operation mode in which a refrigerant valve is converted to the simultaneous operation when the deep freezing compartment load correspondence operation starts.

Here, the simultaneous operation means a state in which a degree of opening of the switching valve is adjusted so that the refrigerant is supplied to both the refrigerating compartment evaporator and the freezing compartment evaporator.

When a refrigerating compartment refrigerant valve (or refrigerating compartment valve) and a freezing compartment refrigerant valve (or freezing compartment valve) are respectively connected to inlets of a refrigerating compartment expansion valve and a freezing compartment expansion valve, instead of the switching valve, the simultaneous operation means that both the refrigerating compartment valve and the freezing compartment valve are opened.

The exclusive operation of the refrigerating compartment may be interpreted to mean that only the refrigerating compartment valve is opened, and only cooling of the refrigerating compartment is possible. Also, the exclusive operation of the freezing compartment (or the exclusive operation of the deep freezing compartment) may be interpreted to mean a state in which only the freezing compartment valve is opened, and only the freezing compartment and/or the deep freezing compartment cooling are possible, and the refrigerating compartment cooling is impossible.

In the simultaneous operation mode, the deep freezing compartment fan may be driven at a low speed or medium speed, a high voltage or medium voltage may be applied to the thermoelectric element, and the refrigerating compartment fan may be controlled to be driven at the medium speed, but is not limited thereto. A voltage applied to the thermoelectric element and a driving speed of the deep freezing compartment fan may be set differently according to a region of the freezing compartment temperature on the temperature region illustrated in (b) of FIG. 7.

For example, when the freezing compartment temperature is in a satisfactory temperature range, a high voltage is applied to the thermoelectric element, and the deep freezing compartment fan may be controlled to be driven at the medium speed.

Alternatively, when the freezing compartment temperature is in an unsatisfactory temperature region, the medium voltage may be applied to the thermoelectric element, and the deep freezing compartment fan may be controlled to be driven at the low speed.

The controller periodically determines whether a completion condition for first deep freezing compartment load correspondence operation is satisfied while the first deep freezing compartment operation is performed (S140).

The completion condition for the first deep freezing compartment load correspondence operation means that the refrigerating compartment temperature reaches a second satisfaction critical temperature N12 illustrated in (a) of FIG. 7 to enter the satisfactory temperature region A, or the first deep freezing compartment correspondence operation time elapses a set time tb.

That is, when any one of the above two conditions is satisfied, the controller determines that the completion condition for the first deep freezing compartment load correspondence operation is satisfied. The set time tb may be 30 minutes, but is not limited thereto.

When the completion condition for the first deep freezing compartment load correspondence operation is satisfied, the operation is switched to the second deep freezing compartment load correspondence operation (S160).

The second deep freezing compartment load correspondence operation refers to a state in which the refrigerating compartment valve is closed, and the freezing compartment valve is opened, so that the freezing compartment and the deep freezing compartment operation are possible.

In detail, although the condition for the first deep freezing compartment load correspondence operation is satisfied, the operation is switched to the simultaneous operation, but if the refrigerating compartment temperature is within the satisfactory temperature range, the operation is immediately switched to the second deep freezing compartment load correspondence operation.

In this case, if the refrigerating compartment temperature is in the satisfactory temperature range at a time point at which the first deep freezing compartment load correspondence operation starts, it is also possible to immediately open the freezing compartment valve without being switched to the simultaneous operation to perform the second deep freezing compartment load correspondence operation.

When the freezing compartment valve is opened, a low-temperature and low-pressure two-phase refrigerant flows through the heat sink of the thermoelectric module to absorb heat transferred to the heat generation surface of the thermoelectric element. That is, the heat dissipation function of the heat sink is in a state capable of being performed.

While the second deep freezing compartment load correspondence operation is being performed, the controller continuously determines whether the refrigerating compartment temperature rises to the upper limit input temperature, that is, the first dissatisfaction critical temperature N13 (S160).

If it is determined that the refrigerating compartment temperature enters the upper limit temperature range, the second deep freezing compartment load correspondence operation is ended, and the process returns to the first deep freezing compartment load correspondence operation process (S130). In other words, when the refrigerating compartment load increases, the refrigerating compartment is cooled again and thus is switched to the simultaneous operation state.

As described above, if the load of the refrigerating compartment rises above a set level while the second deep freezing compartment load correspondence operation is being performed, the process in which the first deep freezing compartment load correspondence operation is switched lower the refrigerating compartment temperature to the satisfactory temperature range may be repeatedly performed to perform the deep freezing compartment load correspondence operation without deteriorating cooling performance of the storage compartment in addition to the deep freezing compartment.

On the other hand, while the second deep freezing compartment load correspondence operation is performed, the controller determines whether the completion condition for the second deep freezing compartment load correspondence operation is satisfied (S170). When it is determined that the completion condition is satisfied, the deep freezing compartment load correspondence operation mode are completely ended (S180). If the refrigerator is not powered off (S190), it returns to the initial process (S110) of determining whether the deep freezing compartment mode is in the on state.

The completion condition for the second deep freezing compartment load correspondence operation means that the deep freezing compartment temperature drops to enter an unsatisfactory temperature region B illustrated in (c) of FIG. 7, or a set time $t_c$ elapses from a time point at which the first deep freezing compartment load correspondence operation starts.

In detail, when the deep freezing compartment temperature decreases to reach the second unsatisfactory critical temperature (or upper limit release temperature) N34 during the second deep freezing compartment load correspondence operation, the deep freezing compartment load correspondence operation mode itself is ended.

Alternatively, when the set time $t_c$ elapses from the time point at which an input condition for the deep freezing compartment load correspondence operation occurs, the deep freezing compartment load correspondence operation mode is ended even though the second dissatisfaction critical temperature N34 is not reached. The set time $t_c$ may be 150 minutes, but is not limited thereto.

Figure 9:
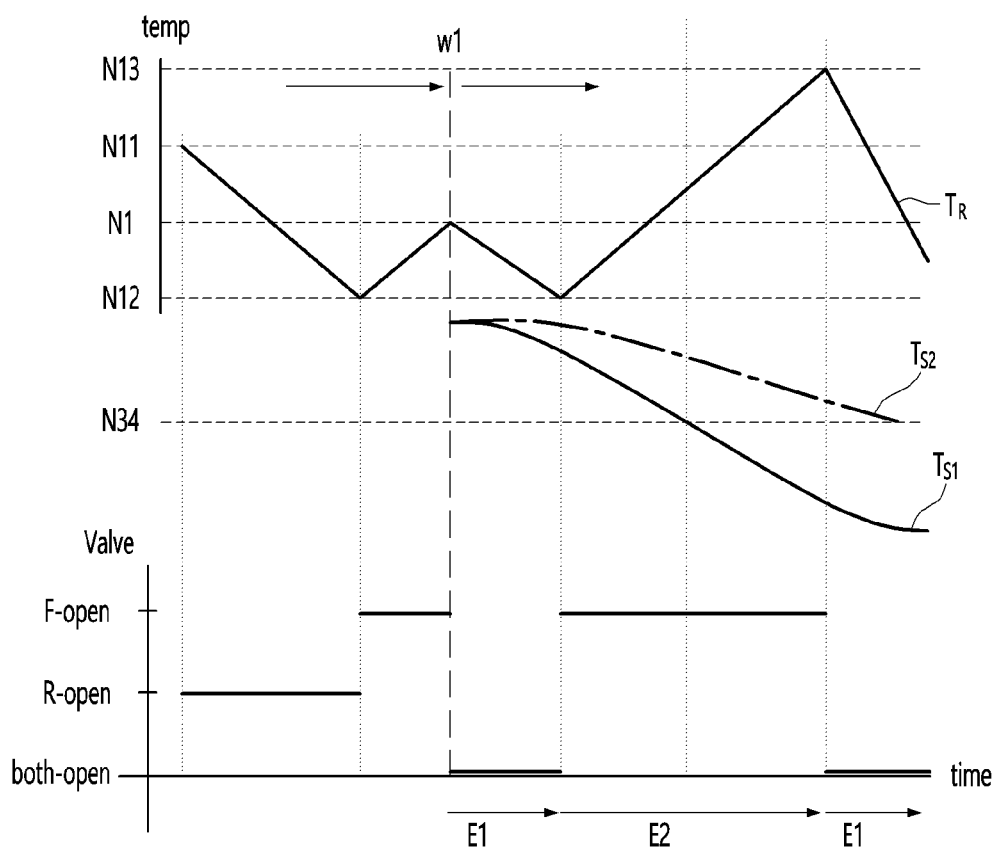
FIG. 9 is a graph illustrating a variation in temperature of a refrigerating compartment and a deep freezing compartment during a deep freezing compartment load correspondence operation and an opening and closing state of a refrigerant valve according to an embodiment of the present invention.

FIG. 9 is a graph illustrating a variation in temperature of the refrigerating compartment and the deep freezing compartment during a deep freezing compartment load correspondence operation and an opening and closing state of the refrigerant valve according to an embodiment of the present invention.

Referring to FIG. 9, a normal control operation is performed until a time point w1 at which an input condition for the deep freezing compartment load correspondence operation is satisfied.

In detail, the temperature change curve TR of FIG. 9 is a graph that shows a temperature change of the refrigerating compartment, and the temperature change curves TS1 and TS2 are graphs showing a temperature change of the deep freezing compartment.

When the refrigerating compartment temperature is in the unsatisfactory temperature region B in a state in which the condition for the deep freezing compartment load correspondence operation is not satisfied, the refrigerating compartment valve is opened so that the refrigerating compartment temperature reaches a first satisfactory critical temperature (N11).

When the refrigerating compartment temperature drops to the first satisfactory critical temperature N11, the refrigerating compartment valve is closed, and the freezing compartment valve is opened, so that the freezing compartment temperature reaches a first satisfactory critical temperature N21. The temperature of the refrigerating compartment will gradually rise while the freezing compartment valve is opened, and the exclusive operation of the freezing compartment is performed.

If a situation in which the condition for the deep freezing compartment load correspondence operation is satisfied occurs while the refrigerating compartment independent operation or the freezing compartment independent operation is performed, a first deep freezing compartment load correspondence operation E1 is switched at a time point w1. That is, both the refrigerating compartment valve and the freezing compartment valve are opened.

Then, a portion of the refrigerant sequentially passes through the heat sink and the freezing compartment evaporator, and the remaining portion passes through the refrigerating compartment evaporator so as to be in a state capable of cooling the refrigerating compartment and the freezing compartment.

If the freezing compartment temperature is higher than the unsatisfactory temperature, the medium voltage is applied to the thermoelectric element, and the deep freezing compartment fan is controlled to be driven at the low speed. However, when the freezing compartment temperature is the satisfactory temperature, the high voltage is applied to the thermoelectric element, and the deep freezing compartment fan is controlled to be driven at the medium speed.

When the refrigerating compartment temperature drops again to enter the satisfactory temperature range, the operation is switched to the second deep freezing compartment load correspondence operation E2. If the refrigerating compartment temperature increases to the upper limit again on the way, it is switched to the first deep freezing compartment load correspondence operation E1.

According to the deep freezing compartment temperature change graph Ts1, since the deep freezing compartment temperature dropping to the second unsatisfactory critical temperature (upper limit release temperature) (N34) during the second deep freezing compartment load correspondence operation, the deep freezing compartment load correspondence operation is ended, and the normal operation for lowering the refrigerator temperature, that is, the refrigerating compartment cooling operation be performed.

According to the deep freezing compartment temperature change graph Ts2, even when the refrigerating compartment temperature rises to the upper limit input temperature N13, since the deep freezing compartment temperature does not reach the upper limit release temperature N34, in the second deep freezing compartment load correspondence operation E2, It is switched to the first deep freezing compartment load correspondence operation E1, and thus, the deep freezing compartment load correspondence operation mode is continued.

As described above, until the deep freezing compartment temperature reaches the upper limit release temperature N34, or until the set time tb, for example, 150 minutes elapses after the first deep freezing compartment load correspondence operation starts, a process in which the first deep freezing compartment load correspondence operation and the second deep freezing compartment load correspondence operation E2 are switched may be repeatedly performed.

Even if the condition for the freezing compartment defrost operation is satisfied while the deep freezing compartment load correspondence operation mode is being performed, the freezing compartment defrost operation may be programmed to be ignored. That is, if the defrost operation and the load correspondence operation are set to the same operation mode, and the other one performing condition is satisfied while either one is being performed, the other operation mode is performed after the current operation mode is ended.

In addition, when the condition for the refrigeration compartment or freezing compartment load correspondence operation is satisfied while the deep freezing compartment load correspondence operation is being performed, the deep freezing compartment load correspondence operation may be performed by priority.

In addition, if the refrigeration compartment or freezing compartment load correspondence operation is satisfied while the condition for the deep freezing compartment load correspondence operation is satisfied, the refrigerating compartment or freezing compartment load correspondence operation may be ended, and the deep freezing compartment load correspondence operation may be performed.

In addition, if the condition for the deep freezing compartment load correspondence operation is satisfied while the exclusive operation of the refrigerating compartment or the exclusive operation of the freezing compartment is being performed, the refrigerating compartment fan and the freezing compartment fan operate at the medium speed after being switched to the simultaneous operation for the first deep freezing compartment load correspondence operation.

On the other hand, if the condition for the deep freezing compartment load correspondence operation is satisfied while the simultaneous operation of the refrigerating compartment and the freezing compartment is already being performed, the simultaneous operation may be maintained for the first deep freezing compartment load correspondence operation, but each of the refrigerating compartment fan and the freezing compartment fan may be driven at the high speed.

In addition, the compressor is controlled to be driven at the maximum cooling capacity during the deep freezing compartment load correspondence operation.

Hereinafter, a method for controlling the refrigerator, which is performed when the deep freezing compartment load correspondence operation and the refrigerating compartment operation conflict with each other will be described. The refrigerating compartment operation should be interpreted as including not only the refrigerating compartment load correspondence operation but also the normal operation of the refrigerating compartment. The normal operation of the refrigerating compartment refers to a refrigerating compartment cooling operation performed when an internal load of the refrigerating compartment naturally increases without opening the refrigerating compartment door.

Figure 10:
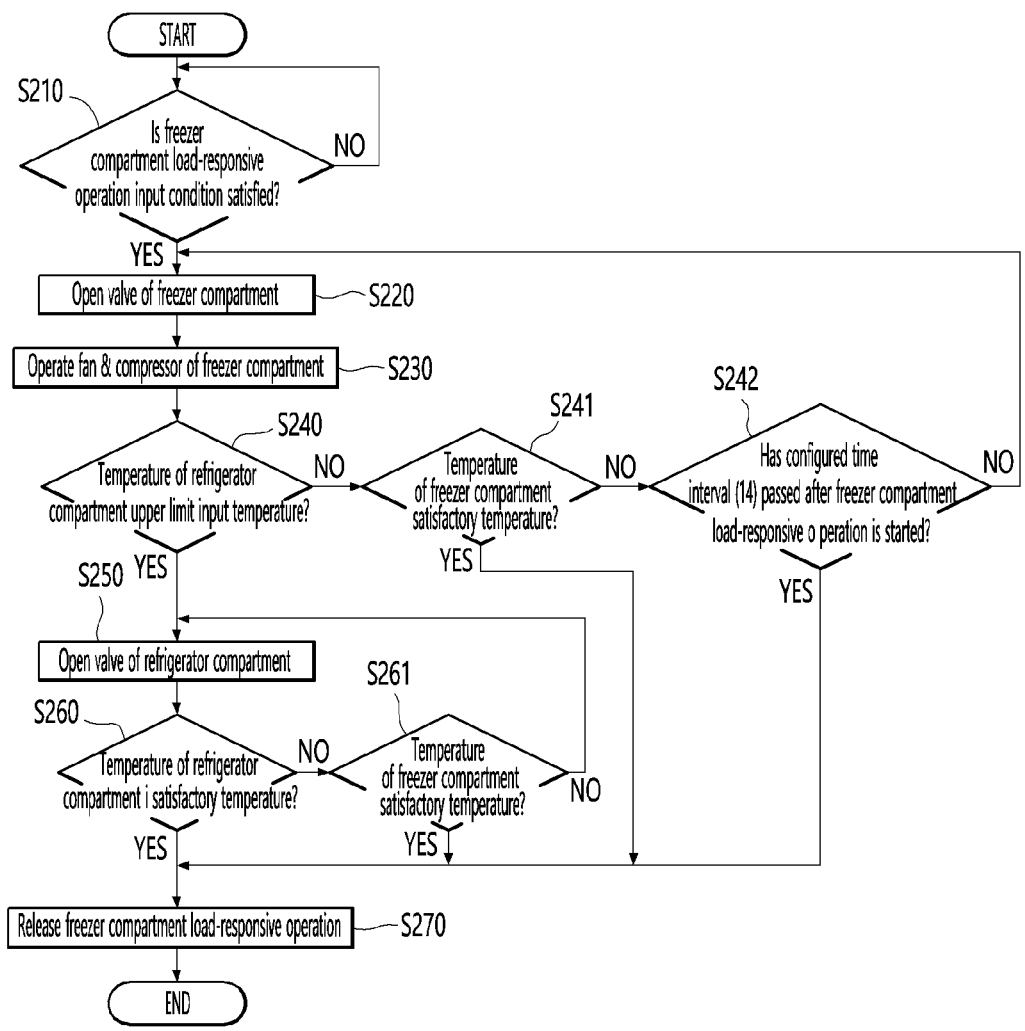
FIG. 10 is a flowchart illustrating a method for controlling a freezing compartment load correspondence operation according to an embodiment of the present invention.

FIG. 10 is a flowchart illustrating a method for controlling a freezing compartment load correspondence operation according to an embodiment of the present invention.

Referring to FIG. 10, a freezing compartment load correspondence operation according to an embodiment of the present invention is equally applied not only when a deep freezing compartment mode is in an on state, but also in an off state. However, an input condition for the freezing compartment load correspondence operation when the deep freezing compartment mode is in the on state and an input condition for the freezing compartment load correspondence operation when the deep freezing compartment mode is in the off state may be set differently.

Specifically, the input condition for the freezing compartment load correspondence operation when the deep freezing compartment mode is in the on state may be defined as "an input condition for a first freezing compartment load correspondence operation". The input condition for the first freezing compartment load correspondence operation may be set to a case in which the freezing compartment temperature rises by a set temperature $T_a$ within a set time ta from a time point at which the freezing compartment door is closed. The set time ta may be 210 seconds, but is not limited thereto, and the set temperature $T_a$ may be 2° C., but is not limited thereto.

When the deep freezing compartment mode is in the on state, the input condition for the first freezing compartment load correspondence operation is satisfied, and in addition, when the condition that a room temperature zone (RT zone) to which the current room temperature belongs corresponds to an area other than a high temperature area has to be satisfied, the freezing compartment load correspondence operation may be performed.

In detail, the controller may store a lookup table divided into a plurality of room temperature zones (RT zones) according to a range of the room temperature. As an example, as shown in Table 1 below, it may be subdivided into eight room temperature zones (RT zones) according to the range of the room temperature. However, the present invention is not limited thereto.

room temperature belongs does not correspond to a low temperature zone and a medium temperature zone but correspond to the high temperature zone, the freezing compartment load correspondence operation may not be performed, and the freezing compartment normal operation may be performed. That is, when the freezing compartment temperature enters an unsatisfactory temperature region or an upper limit temperature region, a freezing compartment cooling operation may be performed.

When the deep freezing compartment mode is in an off state, an input condition for the freezing compartment load correspondence operation may be defined as an "input condition for a second freezing compartment load correspondence operation".

The input condition for the second freezing compartment load correspondence operation may be set when the freezing compartment temperature exceeds a freezing compartment notch temperature N2 or rises to an unsatisfactory temperature region within a set time $t_c$ after closing a freezing compartment door. The set time $t_c$ may be 3 minutes, but is not limited thereto.

Here, a minimum value of a heat load that satisfies the "the input condition for the first freezing compartment load correspondence operation" may be set to be less than a minimum value of a heat load that satisfies the "the input condition for the second freezing compartment load-correspondence operation". In other words, the heat load that satisfies the input condition for the second freezing compartment load correspondence operation may satisfy the input condition for the first freezing compartment load correspondence operation, but the heat load may not satisfy the input condition for the first freezing compartment load correspondence satisfies the input condition for the second freezing compartment load correspondence.

The reason is that, in the state in which the deep freezing compartment mode is in the on state, the deep freezing compartment temperature is in an extremely low temperature state, and in the state in which the deep freezing compartment mode is in the off state, the deep freezing compartment temperature is the freezing compartment temperature. That is, when the deep freezing compartment mode is in the on state, even if the heat load input into the freezing compartment is relatively small, possibility in which frost

TABLE 1

| High temperature region | | Medium temperature region | | | Low temperature region | | |
|---|---|---|---|---|---|---|---|
| RT Zone 1 | RT Zone 2 | RT Zone 3 | RT Zone 4 | RT Zone 5 | RT Zone 6 | RT Zone 7 | RT Zone 8 |
| T ≥ 38° C. | 34° C. ≤ T < 38° C. | 27° C. ≤ T < 34° C. | 22° C. ≤ T < 27° C. | 18° C. ≤ T < 22° C. | 12° C. ≤ T < 18° C. | 8° C. ≤ T < 12° C. | T < 8° C. |

In more detail, a zone of the temperature range with the highest room temperature may be defined as an RT zone 1 (or Z1), and a zone of the temperature range with the lowest room temperature may be defined as an RT zone 8 (or Z8). Here, Z1 may be mainly seen as the indoor state in midsummer, and Z8 may be seen as an indoor state in the middle of winter. Furthermore, the room temperature zones may be grouped into a large category, a medium category, and a small category. For example, as shown in Table 1, the room temperature zone may be defined as a low temperature zone, a medium temperature zone (or a comfortable zone), and a high temperature zone according to the temperature range. If it is determined that the zone (RT zone) to which the current occurs on an outer wall of the deep freezing compartment is higher than when the deep freezing compartment mode is in the off state.

Accordingly, under a condition in which an amount of heat load penetrated into the freezing compartment is the same, when the deep freezing compartment mode is in the on state, the freezing compartment load correspondence operation is performed, but when the deep freezing compartment mode is in the off state, the freezing compartment load correspondence operation may not be performed.

When the deep freezing compartment mode is in the off state, the input condition for the second freezing compartment load correspondence operation is satisfied, and in addition, when the condition that a room temperature zone (RT zone) to which the current room temperature belongs corresponds to a medium temperature region has to be satisfied, the freezing compartment load correspondence operation may be performed.

Here, the fact that the freezing compartment load correspondence operation is performed only when the room temperature belongs to the medium temperature region in a state in which the deep freezing compartment is in the off state is different from the input condition for the freezing compartment load correspondence operation in a state in which the deep freezing compartment mode is in the on state.

The reason is that, in the state in which the deep freezing compartment mode is in the off state, the deep freezing compartment temperature and the freezing compartment temperature are controlled to be substantially the same. Thus, in the low temperature region, a normal operation of the freezing compartment may be performed without having to input the freezing compartment load correspondence operation.

In summary, in operation S210, the controller determines whether the input conditions for the freezing compartment load correspondence operation, which are respectively set in the case, in which the deep freezing compartment mode is in the on state and the off state, are satisfied.

In other words, when the controller receives an opening signal of the freezing compartment door, the controller checks the on or off state of the deep freezing compartment mode. It is determined whether the operating condition set for each state is satisfied.

Since the main idea of the present invention is a control method performed when the deep freezing compartment load correspondence operation and the freezing compartment load correspondence operation conflict with each other, the controller determines whether the input condition for the first freezing compartment load correspondence operation is satisfied, and determines whether the room temperature belongs a region rather than the high temperature region.

If it is determined that the input condition for the freezing compartment load correspondence operation is satisfied, the freezing compartment valve is opened to allow the refrigerant to flow toward the freezing compartment evaporator (S220). Here, that opens the freezing compartment valve may be interpreted as an exclusive operation of the freezing compartment, in which only the freezing compartment is cooled by allowing the refrigerant to flow only toward the freezing compartment.

At the same time, the freezing compartment fan and the compressor are controlled to be driven (S230). In detail, when the freezing compartment load correspondence operation starts, the freezing compartment fan may rotate at the medium speed, and the compressor may be controlled to be driven with maximum cooling capacity, but is not limited thereto.

While the freezing compartment load correspondence operation is performed, the controller determines whether the refrigerating compartment temperature has risen above the upper limit input temperature N13 illustrated in (a) of FIG. 7 (S240).

If it is determined that the refrigerating compartment temperature enters an upper limit temperature region C, the controller also opens the refrigerating compartment valve to be switched to a simultaneous operation of cooling the refrigerating compartment and the freezing compartment together (S250).

During simultaneous operation, both the refrigerator compartment fan and the freezing compartment fan may be controlled to rotate at a first speed, but are not limited thereto. During simultaneous operation, it may be controlled so that the freezing compartment load correspondence operation is not performed even if the condition for the freezing compartment load correspondence operation is satisfied.

In addition, when the refrigerating compartment temperature enters a satisfactory temperature region A illustrated in (a) of FIG. 7 (S260), and when the freezing compartment temperature enters a satisfactory temperature region A illustrated in (b) of FIG. 7, if at least one condition is satisfied, the freezing compartment load correspondence operation may be released (S270). That is, even when the temperatures of the refrigerating compartment and the freezing compartment simultaneously enter the satisfactory temperature range, the freezing compartment load correspondence operation may be controlled to be released.

Here, the release of the freezing compartment load correspondence operation may be interpreted as closing the freezing compartment valve and stopping the freezing compartment fan, which means that a simultaneous operation mode is ended.

In addition, even when only the refrigerating compartment temperature enters the satisfactory temperature range, the freezing compartment load correspondence operation is ended because the freezing compartment is cooled to the satisfactory temperature range through the freezing compartment normal operation after the freezing compartment load correspondence operation is ended.

In operation S240, if the refrigerating compartment temperature is within the satisfactory temperature range or the unsatisfactory temperature range, a process of determining whether an inner freezing temperature enters the satisfactory temperature range is performed while the freezing compartment load correspondence operation is continued (S241).

In detail, if it is determined that the freezing compartment temperature enters the satisfactory temperature range illustrated in (b) of FIG. 7, naturally, the process proceeds to operation S270 of releasing the freezing compartment load correspondence operation.

However, when the freezing compartment temperature does not reach the satisfactory temperature range, it is determined whether the freezing compartment load correspondence operation elapses a set time t4 (S242). If it is determined that the set time t4 elapses, the freezing compartment load correspondence operation is released even if the freezing compartment temperature does not enter the satisfactory temperature region A (S270).

If the set time t4 does not elapse after the freezing compartment load correspondence operation starts, the freezing compartment valve is maintained in the opened state (S220), and the operations of the freezing compartment fan and compressor are maintained (S230), so that the freezing compartment load correspondence operation is continuously performed until the freezing compartment temperature enters the satisfactory temperature region.

Hereinafter, a method for controlling the refrigerator when the deep freezing compartment load correspondence operation and the freezing compartment load correspondence operation conflict with each other will be described.

The conflict between the two load correspondence operations includes both a case in which input situations for two load correspondence operations occur at the same time and a case in which input situations for the two load correspondence operations occur sequentially with a time difference to conflict with each other.

Since it is the content of the conflict between the deep freezing compartment load correspondence operation and other load correspondence operations, it is of course necessary that the deep freezing compartment mode is in the on state.

Figure 11:
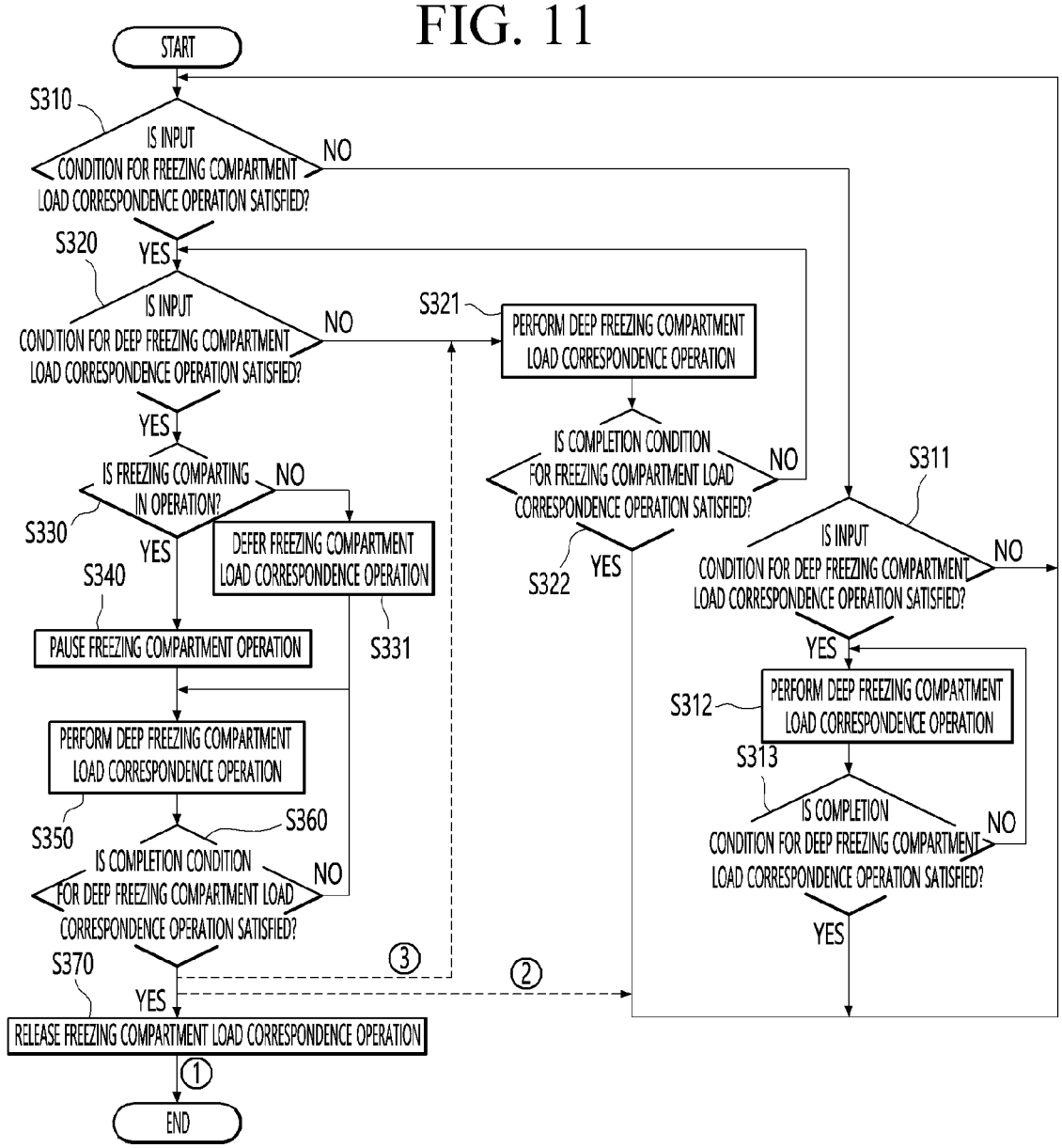
FIG. 11 is a flowchart illustrating a method for controlling a refrigerator according to an embodiment of the present invention, which is performed when a deep freezing compartment load correspondence operation and a freezing compartment load correspondence operation conflict with each other.

FIG. 11 is a flowchart illustrating a method for controlling the refrigerator according to an embodiment of the present invention, which is performed when the deep freezing compartment load correspondence operation and the freezing compartment load correspondence operation conflict with each other.

Referring to FIG. 11, the controller determines whether the input condition for the freezing compartment load correspondence operation is satisfied (S310) and whether the input condition for the deep freezing compartment load correspondence operation is satisfied (S311, S320). Here, the input condition for the freezing compartment load correspondence operation may refer to an input condition for a first freezing compartment load correspondence operation.

If the input condition for the freezing compartment load correspondence operation is not satisfied, it is determined whether the input condition for the deep freezing compartment load correspondence operation is satisfied (S311). When it is determined that only the input condition for the deep freezing compartment load correspondence operation is satisfied, the controller performs the deep freezing compartment load correspondence operation (see FIG. 8) (S312). When the completion condition for the deep freezing compartment load correspondence operation is satisfied (S313), as long as the refrigerator is not turned off (S380), the process of determining whether the load correspondence operation conflicts is continuously performed is repeatedly performed.

If it is determined that the input condition for the freezing compartment load correspondence operation is satisfied, but the input condition for the deep freezing compartment load correspondence operation is not satisfied, only the freezing compartment load correspondence operation is performed (S321), and when the completion condition for the freezing compartment load correspondence operation is satisfied (S322), the process of determining whether the load correspondence operation conflicts is repeatedly performed.

On the other hand, in the state in which the completion condition for the freezing compartment load correspondence operation is not satisfied, it is continuously determined whether the input condition for the deep freezing compartment load correspondence operation is satisfied. This is to detect whether the input situation of the deep freezing compartment load correspondence operation occurs to cause the conflict between the load correspondence operations during the freezing compartment load correspondence operation.

In the state in which the input condition for the freezing compartment load correspondence operation is satisfied, if it is determined that the input condition for the deep freezing compartment load correspondence operation is also satisfied, the controller checks whether the freezing compartment is currently operating (S330). Here, the freezing compartment operation may include both the freezing compartment normal operation and the freezing compartment load correspondence operation.

If the freezing compartment is currently in operation, the freezing compartment operation is stopped (S340), and if the freezing compartment is not in operation, the freezing compartment load correspondence operation is suspended (S331). The deep freezing compartment load correspondence operation is performed in preference to the freezing compartment load correspondence operation (S350).

While the deep freezing compartment load correspondence operation is performed, the controller periodically determines whether the completion condition for the deep freezing compartment load correspondence operation is satisfied (S360). Here, since the deep freezing compartment load correspondence operation is prioritized with respect to the freezing compartment load correspondence operation, it is not determined whether the input condition for the freezing compartment load correspondence operation is satisfied during the deep freezing compartment load correspondence operation.

When the completion condition for the deep freezing compartment correspondence operation is satisfied, the controller may perform any one of the following three methods.

As the first method (①), the freezing compartment load correspondence operation is released together with the end of the deep freezing compartment load correspondence operation (S370). When the freezing compartment load correspondence operation is released, an algorithm for the freezing compartment load correspondence operation according to the present embodiment is ended. Then, the paused or suspended freezing compartment load correspondence operation is no longer performed and then return to a normal operation state before the load correspondence operation.

As the second method (②), if the completion operation for the deep freezing compartment load correspondence operation is satisfied (S360), a process of redetermining whether the input condition for the freezing compartment load correspondence operation is satisfied without getting out of the algorithm for the freezing compartment load correspondence operation may be performed. That is, it may be controlled to return to the process (S110).

As a third method (③), the freezing compartment load operation is temporarily paused while the deep freezing compartment load correspondence operation is performed, and when the deep freezing compartment load correspondence operation is completed, the paused freezing compartment load correspondence operation may be continued immediately.

In other words, when the completion condition for the deep freezing compartment load correspondence operation is satisfied, the process returns to operation S321 to perform the freezing compartment load correspondence operation.

The invention claimed is:
1. A refrigerator, comprising:
a refrigerating compartment;
a freezing compartment partitioned from the refrigerating compartment;
a deep freezing compartment accommodated in the freezing compartment and partitioned from the freezing compartment;
a thermoelectric module to cool the deep freezing compartment to a temperature lower than that of the freezing compartment;
a temperature sensor to detect a temperature at the deep freezing compartment;
a deep freezing compartment fan to cause an internal air of the deep freezing compartment to forcibly flow;
a freezing compartment fan to cause an internal air of the freezing compartment to forcibly flow; and a controller configured to control driving of the thermoelectric module, the freezing compartment fan, and the deep freezing compartment fan, wherein the controller is configured to:

determine whether a deep freezing compartment mode is in an on state or an off state;

determine whether an input condition for a deep freezing compartment load correspondence operation is satisfied; and determine whether an input condition for a freezing compartment load correspondence operation is satisfied, wherein, when the deep freezing compartment mode is in the on state, and both of the input conditions for the deep freezing compartment load correspondence operation and the freezing compartment load correspondence operation are satisfied, the controller is configured to perform the deep freezing compartment load correspondence operation by priority, wherein, when the input condition for the deep freezing compartment load correspondence operation is satisfied during the freezing compartment load correspondence operation, the controller is configured to stop the freezing compartment load correspondence operation, and when both of the input conditions for the deep freezing compartment load correspondence operation and the freezing compartment load correspondence operation are satisfied, the controller is configured to defer the freezing compartment load correspondence operation.

2. The refrigerator according to claim 1, wherein, when a completion condition of the deep freezing compartment load correspondence operation is satisfied, the controller is configured to end the deep freezing compartment load correspondence operation, and release the freezing compartment load correspondence operation.

3. The refrigerator according to claim 1, wherein, when a completion condition of the deep freezing compartment load correspondence operation is satisfied, the controller is configured to end the deep freezing compartment load correspondence operation, and determine whether or not to perform the freezing compartment load correspondence operation.

4. The refrigerator according to claim 3, wherein, at a time point at which the deep freezing compartment load correspondence operation is ended, when the controller determines that a temperature at the freezing compartment is higher than a notch temperature, the controller is configured to perform the freezing compartment load correspondence operation, and when the controller determines that the temperature at the freezing compartment is less than the notch temperature, the controller is configured to release the freezing compartment load correspondence operation.

5. The refrigerator according to claim 1, wherein, when a completion condition of the deep freezing compartment load correspondence operation is satisfied, the controller is configured to end the deep freezing compartment load correspondence operation, and pursue the freezing compartment load correspondence operation.

6. The refrigerator according to claim 1, wherein the input condition for the deep freezing compartment load correspondence operation comprises:

a first condition in which the temperature of the deep freezing compartment rises to a set temperature or more during a set time after a freezing compartment door is opened;

a second condition in which the temperature of the deep freezing compartment is in an upper limit temperature region;

a third condition in which a first cycle starts after the freezing compartment or the deep freezing compartment is defrosted;

a fourth condition in which the deep freezing compartment mode is switched from the off state to an on state; and a fifth condition in which the refrigerator is switched from a power-off state to a power-on state, wherein, when at least one of the first to fifth conditions is satisfied, the controller is configured to perform a first deep freezing compartment load correspondence operation.

7. The refrigerator according to claim 6, wherein, when the first deep freezing compartment load correspondence operation starts, the controller is configured to perform a simultaneous operation mode in which a refrigerant flows to both a refrigerating compartment evaporator and a freezing compartment evaporator, and when a first completion condition is satisfied, the controller is configured to end the first deep freezing compartment load correspondence operation.

8. The refrigerator according to claim 7, wherein the first completion condition comprises at least one of a condition, in which a temperature at the refrigerating compartment enters a satisfactory temperature region, or a condition, in which a set time elapses after the first deep freezing compartment load correspondence operation starts.

9. The refrigerator according to claim 7, wherein, when the first completion condition is satisfied, the controller is configured to perform a second deep freezing compartment load correspondence operation, and when the second deep freezing compartment load correspondence operation starts, the controller is configured to perform an exclusive operation mode in which the refrigerant flows toward the freezing compartment evaporator.

10. The refrigerator according to claim 9, wherein, when a temperature at the refrigerating compartment increases above an upper limit temperature during the performance of the second deep freezing compartment load correspondence operation, the controller is configured to stop the second deep freezing compartment load correspondence operation and perform the first deep freezing compartment load correspondence operation.

11. The refrigerator according to claim 9, wherein, when the second completion condition is satisfied, the controller is configured to end the second deep freezing compartment load correspondence operation, and determine whether the deep freezing compartment mode is in the on state.

12. The refrigerator according to claim 11, wherein the second completion condition comprises at least one of a condition, in which the deep freezing compartment is lowered to an upper limit release temperature, or a condition, in which a set time elapses after the second deep freezing compartment load correspondence operation starts.

13. The refrigerator according to claim 1, wherein the input condition for the freezing compartment load correspondence operation comprises that a room temperature belongs to a temperature region which is less than a high temperature region, and a temperature at the freezing compartment rises above a set temperature during a set time from a time point at the which the freezing compartment door is closed.

14. The refrigerator according to claim 13, wherein, when the freezing compartment load correspondence operation starts, the controller is configured to open a freezing compartment valve, and drive a freezing compartment fan and a compressor, and the controller is configured to perform the freezing compartment load correspondence operation until the temperature at the freezing compartment enters a satisfactory temperature region, or a set time elapses after the freezing compartment load correspondence operation starts.

15. The refrigerator according to claim 14, wherein, when a temperature at the refrigerating compartment increases above an upper limit input temperature during the performance of the freezing compartment correspondence operation, the controller is configured to open a refrigerating compartment valve to perform an simultaneous operation, and when at least one of the temperature of the refrigerating compartment temperature or the freezing compartment temperature enters the satisfactory temperature region, the controller is configured to release the freezing compartment load correspondence operation.

\* \* \* \* \*